United States Patent [19]
Coueignoux

[11] Patent Number: 6,092,197
[45] Date of Patent: Jul. 18, 2000

[54] SYSTEM AND METHOD FOR THE SECURE DISCOVERY, EXPLOITATION AND PUBLICATION OF INFORMATION

[75] Inventor: Philippe Coueignoux, Lexington, Mass.

[73] Assignee: The Customer Logic Company, LLC, Lexington, Mass.

[21] Appl. No.: 09/001,778

[22] Filed: Dec. 31, 1997

[51] Int. Cl.[7] .................................................. G06F 12/14
[52] U.S. Cl. .......................................... 713/200; 709/201
[58] Field of Search .................... 713/200; 709/200–203, 709/225; 705/78

[56] References Cited

U.S. PATENT DOCUMENTS

| | | | |
|---|---|---|---|
| 4,899,373 | 2/1990 | Lee et al. | 379/207 |
| 5,237,157 | 8/1993 | Kaplan | 235/375 |
| 5,369,571 | 11/1994 | Metts | 364/401 |
| 5,504,890 | 4/1996 | Sanford | 395/600 |
| 5,515,098 | 5/1996 | Carles | 348/8 |
| 5,550,746 | 8/1996 | Jacobs | 364/479.01 |
| 5,552,586 | 9/1996 | Kalman | 235/380 |
| 5,555,346 | 9/1996 | Gross et al. | 395/51 |
| 5,802,508 | 9/1998 | Morgenstern | 706/55 |
| 5,826,242 | 10/1998 | Montulli | 705/27 |
| 5,845,070 | 12/1998 | Ikudome | 395/187.01 |
| 5,862,325 | 1/1999 | Reed et al. | 395/200.31 |
| 5,873,086 | 2/1999 | Fujii et al. | 707/10 |
| 5,875,296 | 2/1999 | Shi et al. | 395/188.01 |
| 5,899,991 | 5/1999 | Karch | 707/5 |

OTHER PUBLICATIONS

Fisher, "New Netscape Web Browser to Offer Push Technology," *The New York Times*, Apr. 15, 1997.

Jackson, "This Bug in Your PC is a Smart Cookie," *Financial Times*, Feb. 12, 1996, p. 15.

Heck, "Intermind Helps Users Keep Up To Date on the Web," *Infoworld*, vol. 19, Issue 14, Apr. 7, 1997.

"Firefly Network Privacy Policy," Apr. 1997.

"BroadVision One–To–One Transforms Your Web Site into a Place of Business," *BroadVision One–To–One Solution Overview*, Apr. 1997.

"Knowledge Representation," *Foundations of Intelligent Knowledge–Based Systems*, pp. 115–133.

*Primary Examiner*—Ayaz R. Sheikh
*Assistant Examiner*—Jigar Pancholi
*Attorney, Agent, or Firm*—Testa, Hurwitz & Thibeault, LLP

[57] ABSTRACT

System and method of discovering and exploiting information such as private or confidential facts from a user, while securing the information from unauthorized publication includes, a sender having a processing module transmitting a request for publication of information about a user; an agent in communication with the sender receiving the request for the information, and a user in communication with the agent responding to prompts initiated by the agent. The prompts request the user to reveal facts relating to the information desired by the sender, and provide indicia relating to authorization for publication of the disclosed facts to the sender. The agent discovers the facts and determines whether such facts are to be made available to the sender. The agent can include a memory module, and a processing module such as a rule engine using dialog classes, for communicating with the sender and user, determining whether the indicia of authorization for the facts permits publication of the facts to the sender, and publishing the facts to the sender when said indicia represents a grant of authorization for publication. The agent can exploit all the facts it has discovered, whether authorized or not for publication, to personalize its communication with the user.

38 Claims, 20 Drawing Sheets

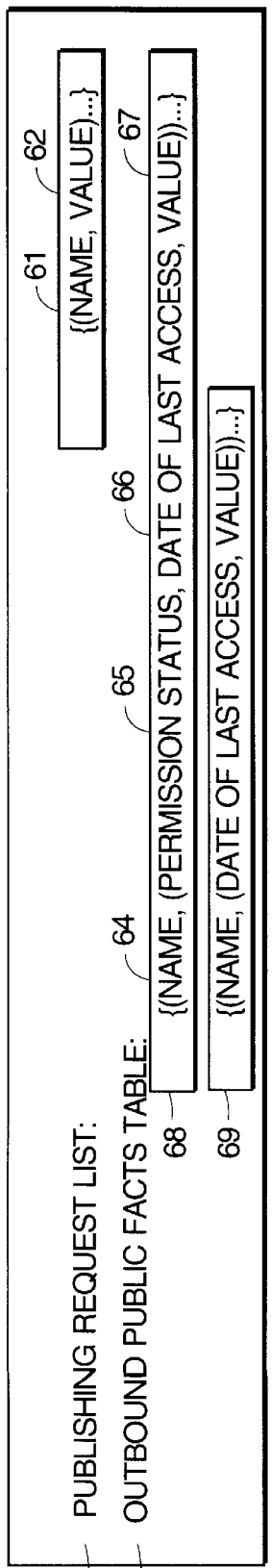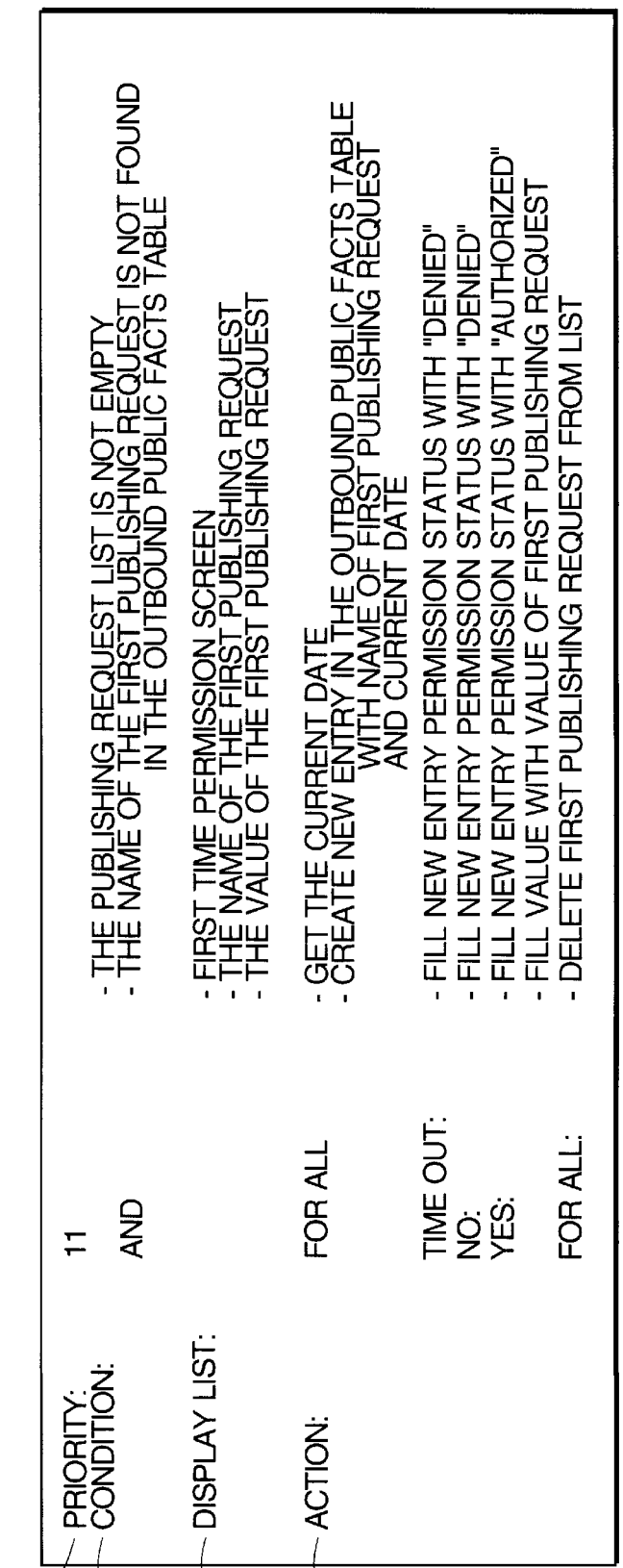

FIG. 6C

| | | |
|---|---|---|
| R-p 208 | PRIORITY: | 11 |
| R-c 210 | CONDITION: | AND - THE PUBLISHING REQUEST LIST IS NOT EMPTY<br>AND - THE NAME OF THE FIRST PUBLISHING REQUEST IS KEY TO AN ENTRY IN THE OUTBOUND PUBLIC FACTS TABLE<br>- THE ENTRY PERMISSION STATUS IS "DENIED" |
| RI-d 212 | DISPLAY LIST: | FOR ALL - PRIOR REFUSAL OVERTURNING SCREEN<br>- THE NAME OF THE FIRST PUBLISHING REQUEST<br>- THE VALUE OF THE FIRST PUBLISHING REQUEST |
| RI-a 214 | ACTION: | TIME OUT: - GET THE CURRENT DATE<br>NO: - UPDATE ENTRY IN THE OUTBOUND PUBLIC FACTS TABLE WITH CURRENT DATE<br>YES:<br>FOR ALL: - FILL NEW ENTRY PERMISSION STATUS WITH "AUTHORIZED"<br>- FILL VALUE WITH VALUE OF FIRST PUBLISHING REQUEST<br>- DELETE FIRST PUBLISHING REQUEST FROM LIST |

FIG. 6D

| | | |
|---|---|---|
| R-p 216 | PRIORITY: | 11 |
| R-c 218 | CONDITION: | AND - THE PUBLISHING REQUEST LIST IS NOT EMPTY<br>AND - THE NAME OF THE FIRST PUBLISHING REQUEST IS KEY TO AN ENTRY IN THE OUTBOUND PUBLIC FACTS TABLE<br>- THE ENTRY PERMISSION STATUS IS "AUTHORIZED" |
| RR-c 220 | CONCLUSION: | - GET THE CURRENT DATE<br>- UPDATE ENTRY IN THE OUTBOUND PUBLIC FACTS TABLE WITH CURRENT DATE<br>- FILL VALUE WITH VALUE OF FIRST PUBLISHING REQUEST<br>- DELETE FIRST PUBLISHING REQUEST FROM LIST |

R-p 222 | PRIORITY: 11

R-c 224 | CONDITION: - THE AUTHORIZATION TIME HAS ELAPSED
OR
- AN AUTHORIZATION CANCELLATION REQUEST HAS BEEN RECEIVED

RR-c 226 | CONCLUSION: - RESET THE AUTHORIZATION TIME
- RESET AUTHORIZATION CANCELLATION REQUEST
- GET THE CURRENT DATE
- UPDATE EVERY ENTRY IN THE OUTBOUND PUBLIC FACTS TABLE WITH PERMISSION STATUS SET TO "DENIED" WITH CURRENT DATE

FIG. 6E

| | | |
|---|---|---|
| 70 — | SPECIAL REQUEST | VALUE INITIALIZED TO "RESET" |
| 71 — | INBOUND PUBLIC FACT SIG | VALUE INITIALIZED TO "RESET" |
| 72 — | OUTBOUND PUBLIC ACT ACK | VALUE INITIALIZED TO "RESET" PERMISSION STATUS INITIALIZED TO "SYSTEM" |

FIG. 7A

| | | |
|---|---|---|
| R-p 228 — | PRIORITY: | XX |
| R-c 230 — | CONDITION: | AND - INBOUND PUBLIC FACT SIG IS SET<br>- OUTBOUND PUBLIC FACT ACK IS RESET |
| RR-c 232 — | CONCLUSION: | - SET SPECIAL REQUEST<br>- SET OUTBOUND PUBLIC FACT ACK |

FIG. 7B

| | | |
|---|---|---|
| R-p 234 — | PRIORITY: | XX |
| R-c 236 — | CONDITION: | AND - INBOUND PUBLIC FACT SIG IS SET<br>- OUTBOUND PUBLIC FACT ACK IS RESET |
| RR-c 238 — | CONCLUSION: | - RESET OUTBOUND PUBLIC FACT ACK |

- 78 — NAME:
- 79 — VALUE: 
- 80 — FACT LIST:
- 86 — SCORE TO DATE
- 81 — {(FACT NAME, {(VALUE,NOTE) ... }, NOTE TO DATE )...}
- 83 — VALUE
- 84 — NOTE
- 85 — NOTE TO DATE
- 82
- 88 — TEMPORARY VALUE
- 87 — UPDATE METHOD (NAME, VALUE)

FIG. 8B

- R-p 240 — PRIORITY: 11
- R-c 242 — CONDITION: 
  - AND — THE PUBLISHING REQUEST LIST IS NOT EMPTY
  - AND — THE NAME OF THE FIRST PUBLISHING REQUEST IS NOT FOUND IN THE OUTBOUND PUBLIC FACTS TABLE
  - — THE VALUE OF THE FIRST PUBLISHING REQUEST IS AN OBJECT OF CLASS QUESTIONNAIRE VALUE
- Rl-a 244 — DISPLAY LIST: FOR ALL
  - — FIRST TIME PERMISSION SCREEN
  - — THE NAME OF THE FIRST PUBLISHING REQUEST
  - — THE SCORE TO DATE OF THE QUESTIONNAIRE VALUE
  - — THE FACT LIST {( FACT NAME, {(VALUE,NOTE) ... }, TO DATE) ...} OF THE QUESTIONNAIRE VALUE
- TIME OUT:
- NO:
- YES:
- Rl-a 246 — ACTION: FOR ALL:
  - — GET THE CURRENT DATE
  - — CREATE NEW ENTRY IN THE OUTBOUND PUBLIC FACTS TABLE WITH NAME OF FIRST PUBLISHING REQUEST AND CURRENT DATE
  - — FILL NEW ENTRY PERMISSION STATUS WITH "DENIED"
  - — FILL NEW ENTRY PERMISSION STATUS WITH "DENIED"
  - — FILL NEW ENTRY PERMISSION STATUS WITH "AUTHORIZED"
  - — FILL VALUE WITH SCORE TO DATE OF THE QUESTIONNAIRE VALUE
  - — DELETE FIRST PUBLISHING REQUEST FROM LIST

FIG. 10B

- 126 — INBOUND QUESTION QUE
- 125 — DEP INTERACTION
- 127 — OUTBOUND ANSWER ANS

FIG. 10C

- 103 — QUESTION: 116 — {(NAME, VALUE)...} 117
- 120 — DECISION: 121 — (NAME, {(VALUE, CODE)...}) 123, 122
- 101 — ANSWER: 118 — {(NAME, VALUE)...} 119

- R-p 248 — PRIORITY: 11
- R-c 250 — CONDITION: AND
  - QUESTION QUE IS SET
  - DEP INTERACTION IS RESET
  - ANSWER ANS IS RESET
- RR-c 252 — CONCLUSION:
  - SET DEP INTERACTION
  - COPY INBOUND QUESTION LIST (WITHOUT QUE) INTO (39)
  - INITIALIZE CHRONOMETER FOR TIME OUT (32)

- R-p 254 — PRIORITY: 11
- R-c 256 — CONDITION: AND
  - DEP INTERACTION IS SET
    - (39) IS EMPTY
    - OR
    - TIME OUT (32) HAS ELAPSED
- RR-c 258 — CONCLUSION:
  - RESET DEP INTERACTION
  - EMPTY (39)
  - SET ANSWER ANS

SA-AAP HIDDEN FACTS
- JOB OFFERED
- YEARS REQUIRED
- SALARY OFFERED
- % OF TIME FOR TRAVEL
- JOB LOCATION OFFERED
- CONTACT INFORMATION

RX-DEP DIALOG CLASSES
- IF ANSWER IS NOT KNOWN...: – ASK JOB OFFERED, YEARS REQUIRED, SALARY OFFERED
- IF JOB OFFERED = JOB SOUGHT AND SALARY OFFERED ≥ SALARY A: – ASK FOR % (OF TIME FOR) TRAVEL
- IF JOB OFFERED = JOB SOUGHT AND SALARY OFFERED ≥ SALARY A: – ASK LOCATION OFFERED
- AND RX IS READY TO DEAL: – ASK WHETHER SA IS INTERESTED
- AND RX IS READY TO DEAL: – ASK FOR SA CONTACT INFORMATION

PURE RULES IN BOTH RX AAP AND DEP
- IF JOB OFFERED = JOB SOUGHT AND SALARY OFFERED ≥ SALARY DESIRED ∴ – EMPLOYEE RX IS INTERESTED
- IF JOB OFFERED = JOB SOUGHT AND % TRAVEL ≤ 5% AND SALARY OFFERED ≥ SALARY A
  OR IF JOB OFFERED = JOB SOUGHT AND % TRAVEL ≤ 20% AND SALARY OFFERED ≥ SALARY B:
  - EMPLOYEE RX IS READY TO DEAL

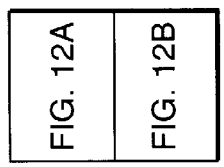

FIG. 12

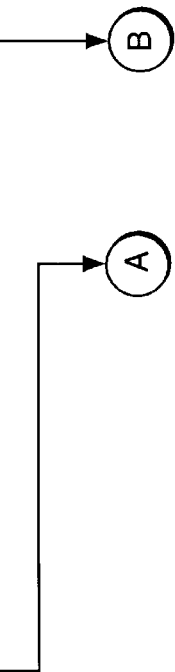

SYSTEM AND METHOD FOR THE SECURE DISCOVERY, EXPLOITATION AND PUBLICATION OF INFORMATION

FIELD OF THE INVENTION

The invention relates to a system and method of discovering and exploiting information such as private or confidential information from a user, while securing the information from unauthorized publication.

BACKGROUND OF THE INVENTION

Consumer research has focused on discovering user information such as demographic, personal or identifying information and using this information to provide the user with products or services tailored to his geographic area, age, gender, nationality or preferences. Typically such information can be obtained through the use of cash-registers, kiosks, telephones, televisions and computers. While information is often obtained for marketing purposes, such information is also useful for other purposes.

A system for obtaining demographic information is described in U.S. Pat. No. 5,369,571 to Metts, in which a store clerk enters data relating to consumer socio-demographic characteristics while ringing consumer's purchases at a cash register. In U.S. Pat. No. 5,237,157 to Kaplan, discovery of marketing information relative to the tastes of music buyers is carried out while a user interacts with a music sampling kiosk in a music store. In U.S. Pat. No. 5,515,098 to Carles, marketing data previously obtained and recorded on a central database is used to target specific commercial messages to on-demand television subscribers. The operation of a central database is a common characteristic of the above systems. Personalized interactions based on user-dependent data, if present, require a user to provide user information for this database as a condition to obtaining the benefit of any privileges provided thereby.

In other systems used to obtain identifying information from a user, all interactions between a user and the system are localized, including user-dependent discovery, storage and use of the information. In U.S. Pat. No. 5,555,074 to Jacobs disclosed is a system for delivering personalized greeting cards to consumers interacting with a kiosk. The system is able to query a consumer for user-dependent data, store it for the duration of the interactive session and use it to propose a selection of personalized products for purchase. Although this system does not provide for permanent recording of user-dependent data, its ability to perform data discovery and exploitation relative to a plurality of users is similar to the above systems that retain such data in a central database.

In U.S. Pat. No. 4,899,373 to Lee, a system providing personalized, location-independent telephone services is disclosed, in which user-dependent data is transmitted from a credit card and temporarily stored on the local exchange that services the telephone picked up by the user. In U.S. Pat. No. 5,552,586 to Kalman, a memory card is used to store user data relative to the interactions of the user with a plurality of social agencies. While this system provides access codes to allow for the protection of confidential data against disclosure to an unauthorized agency, when access is granted to an authorized agency, user data is unprotected as data is recorded in the computer of this case worker. These and other systems that record user-dependent data on a local medium, particularly a removable medium such as a disc drive, typically allow others to access this data independently of user control. Often, access is obtained by providers of the card or storage medium, as well as others with whom the user-dependent data was discovered in the first place.

Similar observations can be made relative to the use of the Internet. Hypertext markup language HTML and Java applets can be used in a discovery phase to report their findings to a central database. Similarly, cookies and executable code for push technology can record user-dependent data locally to avoid repetitive data entry by the user. Such processes can be thought of as a local extension of the central server, as typically they provide no privacy protection besides a possible declaration of intent to preserve information in confidence.

The proposal by Firefly, Inc. for an "Open Profiling Standard" (OPS) presents a framework for such "before disclosure" user control. Within its scope, attention is given to important issues such as identification of entities and parties and security of communications between them. The OPS describes how an entity may negotiate access to confidential information on a party for the sake of offering a personalized service to this party. While the OPS gives an excellent description of the disclosure process and allows for party-dependent data to be kept locally under the party's control, its spirit is still to trade disclosure for personalization. It would be advantageous to break this link so as to reduce the need for disclosure while potentially increasing its economic value.

SUMMARY OF THE INVENTION

The present invention is directed to a system and method for the discovery and controlled publication of information. In one embodiment, the system and method discovers information and publishes such information only when consent for publication is affirmatively given. The present invention is further directed to a system and method for the controlled publication of information. In this embodiment, stored information is published only when consent for publication exists.

In one embodiment, the system includes a sender in communication with a transmission medium, comprising a processing module transmitting a request for publication of a fact over the transmission medium; an agent in communication with the transmission medium, receiving said request for the fact from the sender, and a user in communication with the agent over another transmission medium. The agent requests that the user reveal facts, referred to herein as "private facts" and provide indicia relating to authorization for publication of the revealed facts. Facts having indicia relating to positive authorization for publication are referred to herein as "public facts". The agent receives the facts and determines whether such facts are to be made available to the sender, referred to herein as "published". The agent can include a memory module storing a plurality of facts and the indicia of authorization for publication; a processing module in communication with the memory module for determining whether the indicia of authorization for the facts revealed by a user permits publication of the facts to the sender, and providing the facts to the sender when said indicia of authorization permits publication of the facts, that is, when the facts are considered public facts.

In one embodiment, the system is implemented using one or more rule engines, and a plurality of dialog classes that control the strategy of the interaction between the agent and the user such that the goals of the sender are carried out while the confidentiality of private facts disclosed by the user is maintained. Using the dialog classes the rule engine can prompt the user to reveal private facts and provide indicia of authorization for publication of such facts to the sender. The dialog classes further exploit the private and public facts associated with the user along with known facts about the sender, referred to herein as "inbound public facts", to determine the content of additional prompts provided to the user, as well as to make suggestions to the user.

In one embodiment, the dialog classes can include a plurality of rules, each of which is accorded a priority to aid in the process of rule selection. The rules can include pure rules and interactive rules that require interaction with the user for an action to be executed. Each rule typically includes a condition and an action that is carried out when the condition is satisfied.

In one embodiment, the sender provides to the agent a publishing request list representing the facts desired to be known by the sender in response to the sender's interaction strategy. The publishing request list can comprise a plurality of name and value pairs, each pair representing a category of fact desired by a sender. Private facts authorized for publication to the sender can be implemented in a hash table, which can include a fact and an authorization for publication, referred to herein as "permission status". In another embodiment, a plurality of interaction rules can be used to determine the action to be accorded to a sender's publishing request. In yet another embodiment, a pure rule can determine the action to be accorded to a sender's publishing request.

In another embodiment, the user can be provided be the sender with a questionnaire asking for a plurality of private facts, which result in a score that, if authorized for publication, can be published to the sender in response to a publishing request.

In yet another embodiment, the agent can receive a special request from the sender, such as, for example, a special product or price offering that should be made known to the user immediately because of its temporal nature. In another embodiment, the agent can receive a special request from the user, such as, for example, a request for cancellation of an authorization for publication.

In yet another embodiment, a plurality of senders can share one or more agents and public facts. In this embodiment, an agent can serve a plurality of senders using a common set of public facts, private facts and dialog classes, as well as sender-specific sets of public facts, private facts and dialog classes.

In still another embodiment of the present invention, the sender and the user can exist as automated processing units, both having rule engines operating on specific dialog classes to discover facts about the other part, reveal facts, ask for and receive authorization for publication of certain facts which can be made known to the other party.

In yet another embodiment of the present invention, a method of providing secure discovery and publication of facts about an entity comprises; receiving at an agent, a publishing request from a sender; prompting a user to reveal facts; requesting authorization for publication of the facts revealed; and providing only those facts that include an authorization for publication to the sender.

In yet another embodiment of the present invention, a method of providing controlled publication of facts to an entity comprises; transmitting from a sender to an agent a publishing request; retrieving from storage a fact relating to the publishing request and information relating to an authorization for publication associated with the fact; determining whether the authorization for publication indicates a grant of authorization; and providing the fact to the sender when a grant of authorization exists.

The foregoing and other objects, features, and advantages of the invention will become apparent from the following, more particular description of the preferred embodiments of the invention, as illustrated in the accompanying drawings.

BRIEF DESCRIPTION OF DRAWINGS

FIGS. 6A, 6B and 6C illustrate rules used by the system according to one embodiment of the present invention for determining whether private facts are to be published.

FIGS. 7A, 7B and 7C illustrate rules used by the system for external prompting of the discovery and exploitation process according to one embodiment of the present invention.

FIG. 8 illustrates rules for interpreting user-completed questionnaires according to another embodiment of the present invention.

FIGS. 10B, 10C, 10D, 10E and 10F illustrate rules for carrying out the discovery and exploitation process according to the embodiment of FIG. 10A.

DETAILED DESCRIPTION

Figure 1:
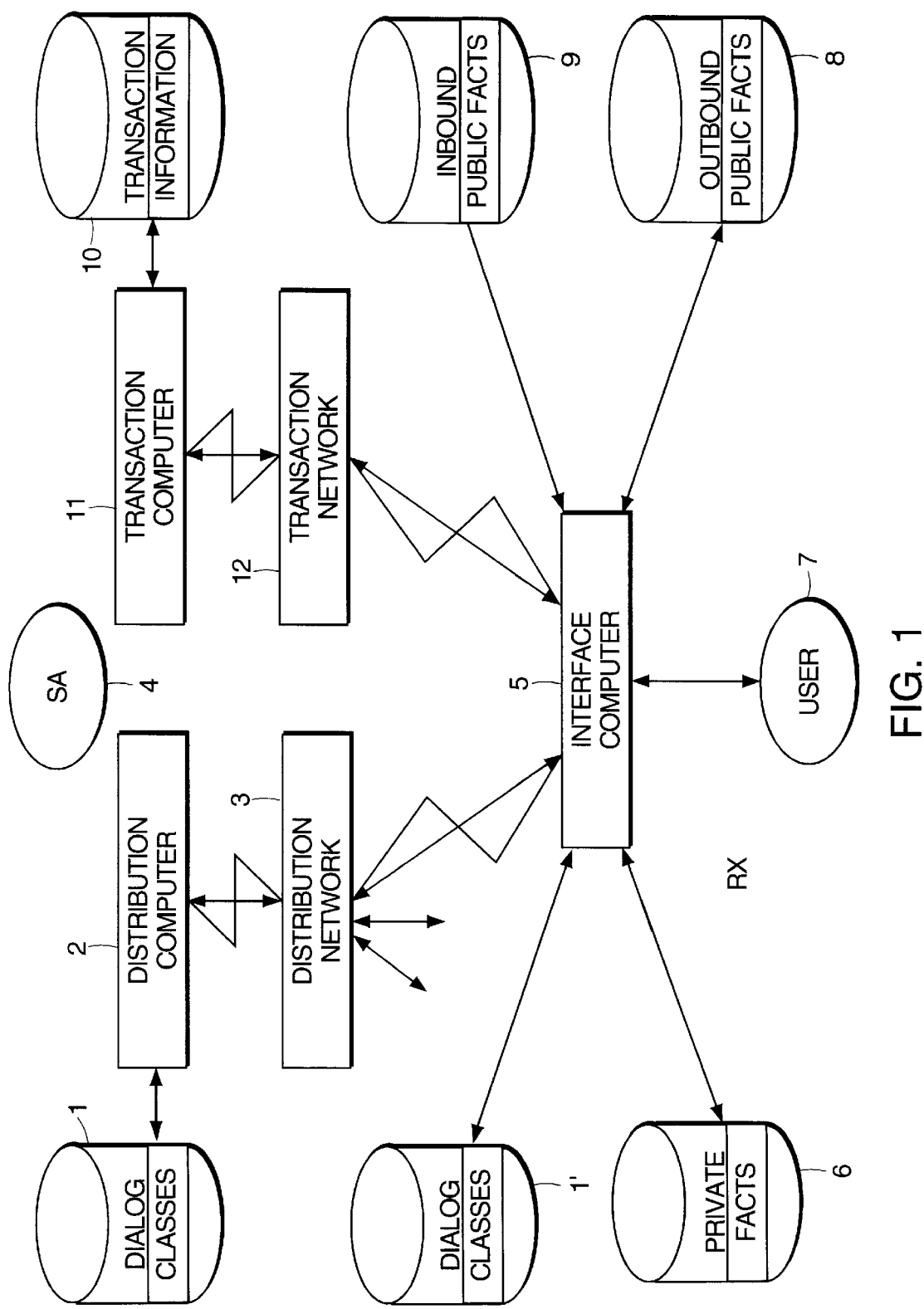
FIG. 1 is a block diagram of the system according to one embodiment of the present invention for discovering, exploiting and publishing facts.

Referring to FIG. 1, shown is a block diagram of a system according to one embodiment of the present invention, for discovering, exploiting and publishing user information, hereinafter referred to as "facts". The system of the present invention is described for purposes of illustration only, as being implemented on a software-programmable computer system using an object-oriented programming language such as Sun Java. The software-programmable computer system is preferably disposed on a network, such as the Internet. It is to be appreciated, however, that the present invention can be implemented in the context of other networks such as, for example, wide area networks WAN, local area networks LAN, intranets and on other computer systems known to hardware designers skilled in the art and using other computer languages known to software programmers skilled in the art.

As shown, a site desiring to acquire information about users, hereinafter referred to as the sender or sending (SA) 4, is in communication with a distribution computer 2 and a memory module 1. The sender 4 can be, for example, a site on the world wide web (WWW) representing a vendor. The user 7 can be a person or entity that interacts with an interface computer 5 to communicate with the sender 4. The memory module 1 associated with the sender 4 stores dialog classes created by or developed for the sender 4. Classes, in object oriented programming, refer to a collection of data and method declarations, and can be used to encode facts and business rules that apply problem-solving knowledge to facts. In the present invention, dialog classes 1 can be programs that control the interaction between the sender 4 and the user 7, particularly executable programs that seek to obtain from the user 7, information that is of interest to sender 4.

The memory module 1 is in communication with a distribution computer 2 which transmits copies of the dialog classes to a distribution network 3. Typically, such a transmission from the memory module 1 occurs in response to a command from a sender 4. The distribution computer 2, upon obtaining the dialog classes, transmits them to the distribution network 3 which can broadcast identical copies of the dialog classes to the memory module 1' via an interface computer 5. The interface computer 5, as further described herein, can comprise, for example, a personal computer, a digital television, or a cable television digital interface that is local to the user 7. It is to be appreciated however, that in alternate embodiments of the present invention, the interface computer 5 need not be local, and can be disposed on a network that services a plurality of senders 4 and a plurality of users 7.

The sender 4 further is in communication with a transaction computer 11 and a transaction network 12. In the present invention, the transaction computer 11 can comprise, for example, a remote server or a server at the sender's 4 internet site. As shown, the transaction network 12 is in communication with the interface computer 5, thereby enabling the user 7 to interact with the sender 4 via the interface computer 5. The transaction computer 11 further is in communication with a transaction information memory module 10 that stores transaction information, such as, for example, information provided by the user 7 and/or the sender 4, such as, comments, questions, purchase units, quantities and dates of delivery, prices and availability. The user 7 can therefore exchange with the transaction computer 11, transaction information. This exchange can then lead to the creation and storage of new transaction information, such as an order or comments, leading to the creation of a file or entry in memory module 10. The transaction information provided by the user 7 as described above, may further include personal information about the user 7 as sought by the sender.

It is important to note that the distribution network 3 and the transaction network 12 can be implemented on the same logical and/or physical network, such as the Internet, a WAN or LAN, an intranet, or an EDI network. The transaction network 12 is essentially a two-way network, that enables the user 7 and the sender 4 to exchange information. The distribution network 3, as will be further described, can be a two-way network, that is, communication is typically carried out from the sender 4 to the interface computer 5, with signals transmitted from the interface computer 5 that request dialog classes, as further described herein. In yet another embodiment, the distribution network 3 can be a one-way network. In another embodiment, the distribution network 3 can include, for example, a distribution of CD-ROMs in which communication is carried out through direct mailing or stores.

The dialog classes stored in memory module 1 are transmitted over the distribution network 3 to the memory module 1'. The dialog classes are transmitted in response to a decision by the sender 4 to publish the dialog classes, that is, to make the dialog classes available to the user 7 in memory module 1' so that the user 7 can interact with the dialog classes on the interface computer 5. In one embodiment of the present invention, the dialog classes can be provided in response to the decision by the sender 4 to publish the dialog classes, and a corresponding decision by the user 7 to receive the dialog classes. In response to such an indication, the sender 4 can initiate transmission of the dialog classes to the memory module 1' and provide for additional updates of the dialog classes. The interaction between the sender 4 and the user 7 is known in Internet jargon, as push-pull technology or simply push technology.

The interface computer 5 can locally execute the dialog classes stored in memory module 1'. The dialog classes, as described above, are programs that automate the logic of the sender 4 and control the strategy of the interaction between the sender 4 and the user 7. The dialog classes can thus prompt the user 7 to provide information, such as personal, secret or confidential information, "private facts," and upon receiving such private facts, determine whether additional prompts should be provided to the user 7 to obtain additional private facts, and what the content of such additional prompts should be. Therefore, during the execution of the dialog classes, as further described, the user 7 can be asked to disclose certain private facts, such as, for example, date of birth, social security number, annual income, mother's maiden name, other family information, eye and hair color, and user-preferences. Execution of the dialog classes enables the user 7 to authorize certain private facts to be made available and published as public facts. Public facts are thus private facts made available to the sender 4 only in response to authorization by the user 7. Additionally, public facts can further comprise sender-related data such as, for example, service messages. In the present embodiment, the interface computer 5 can therefore store, modify and retrieve private and public facts relative to the user 7 as well as public facts relative to the sender 4.

Therefore, the interface computer 5 receives the dialog classes from memory module 1', executes the dialog classes and interacts with the user 7. Any information provided by the user 7 in response to such interactions is stored in the memory module 6 as private facts. These private facts remain in the memory module 6 and are copied as outbound public facts only in response to authorization by the user 7 for disclosure to the sender 4, as will be further described. The outbound public facts are stored in memory module 8. As described above, system information or public facts previously provided by the user 7 to the sender 4, or simply provided by the sender 4, are stored in memory module 9 as inbound public facts, and are transmitted to the interface computer 5 to aid in allowing appropriately tailored prompts to be directed to the user 7.

Figure 2:
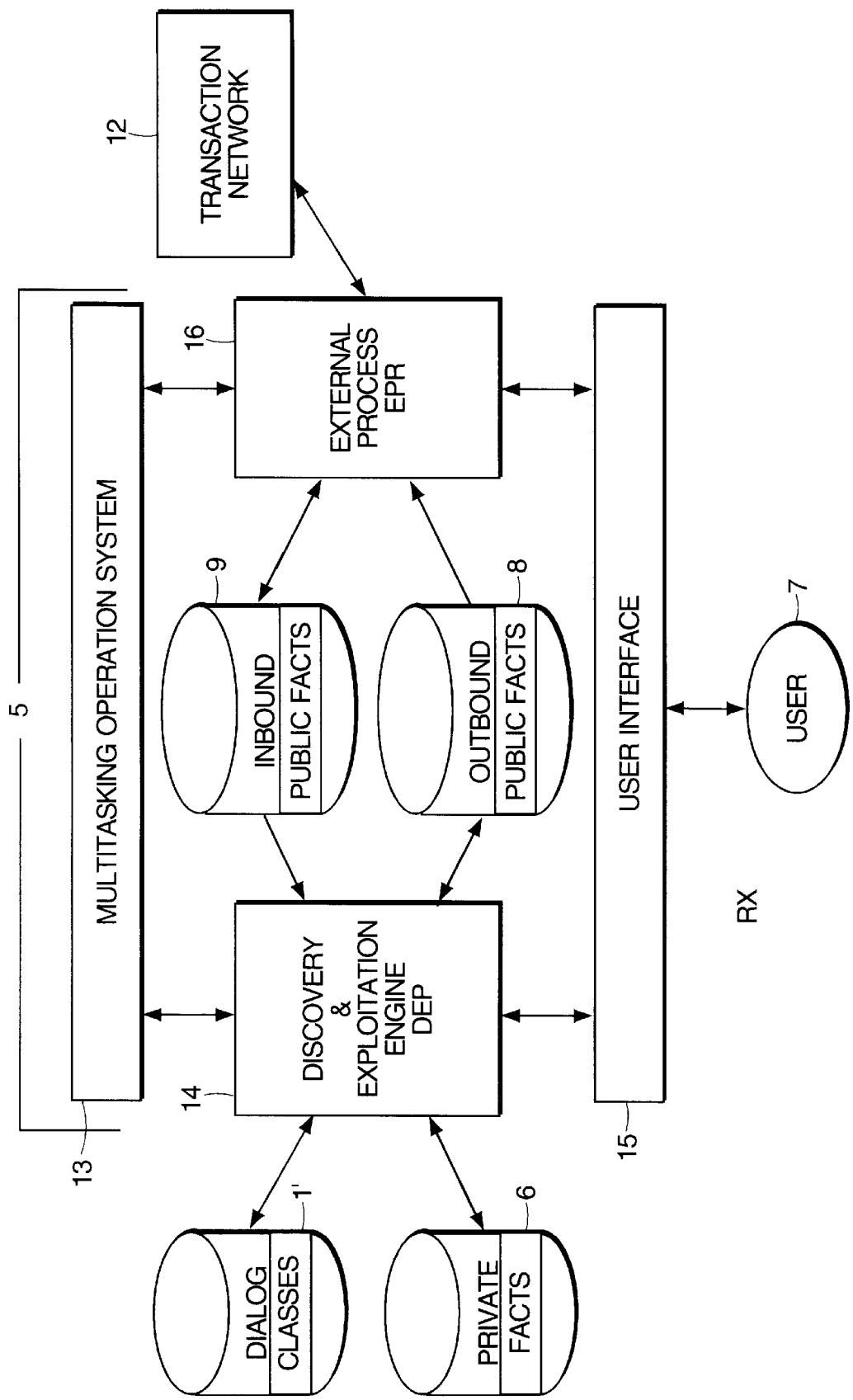
FIG. 2 is a diagram illustrating the interface computer of FIG. 1.

Referring to FIG. 2, shown in further detail is the interface computer 5. As shown, a multitasking operating system 13, such as, for example, a Java virtual machine running on Microsoft Windows 95, controls the operation of the interface computer 5. The operating system 13 runs the discovery and exploitation engine 14, hereinafter referred to as the "DEP" 14, which can transmit local copies of the dialog classes to the memory module 1' and execute local copies of the dialog classes stored in the memory module 1'. In the present embodiment, the DEP 14 is implemented as a rule engine operating with a knowledge base. The knowledge base comprises the dialog classes in memory module 1' and the public and private facts in memory modules 6, 8, 9. It is important to note that each specific fact in object-oriented programming, is represented as an object which is an instance of the relevant generic fact class. For example, looking at the object "sports practiced: golf", note that "golf" is a specific instance of the class "sports practiced". The DEP 14 as a rule engine, thus interprets the dialog classes in the storage module 1' by determining which class is the most relevant to the fact objects held in the storage modules 6, 8 and 9. The DEP 14 then creates new objects or updates existing objects according to the user 7 responses obtained via a user interface 15.

The DEP 14 thus creates, writes, updates, and reads the public facts held in memory module 8 and the private facts held in memory module 6. The DEP 14 further determines which private facts are to become outbound public facts, and stores such facts in memory module 8 so that they are available for further processing by both the DEP 14 and the external process 16 hereinafter referred to as the "EPR" 16. The EPR 16 communicates with the user 7 through the user interface 15, to enable the user 7 to communicate transaction information with the sender 4 over the transaction network 12. As will be further described, private facts cannot be accessed by a system element other than the DEP 14, and can be discovered by the DEP 14 during a single user-interaction session or during multiple user-interaction sessions. The inbound public facts in memory module 9 can further be read by the DEP 14 as transmitted by the EPR 16.

It is to be noted that the DEP 14 can, in other embodiments, be configured using other elements while retaining the functionality described herein in connection with a rule engine. For example, the basic rule engine design described herein can be coupled with free form ancillary modules limited to the computation of some derived facts added to the list of private facts.

The operating system 13 also runs the EPR 16, a rule engine that interacts with the sender 4 and the user 7 via the user interface 15. The EPR 16 can be a local agent of the sender 4, such as a local server or an applet. In another embodiment, the EPR can simply be a local application programming interface (API) remotely accessible from the transaction computer 11 over the transaction network 12. In the present embodiment, the EPR 16 allows the DEP 14 to interact with the transaction computer 11. The EPR 16 can access the outbound public facts in storage module 8 as generated by the DEP 14, and transmit such facts to the sender 4 over the transaction network 12. Additionally, the EPR 16 can receive inbound public facts from the transaction network 12, and store the inbound public facts in memory module 9, to be retrieved by the DEP 14. Further, the EPR 16 can be used to process independent commands received via the user interface 15. In another embodiment, the system can comprise a plurality of EPRs 16, each with its own set of inbound public facts. As further described in FIG. 9, where multiple senders 4 are disposed on a network and share the private and public facts, a plurality of EPRs 16 can be desirable.

Figure 3A:
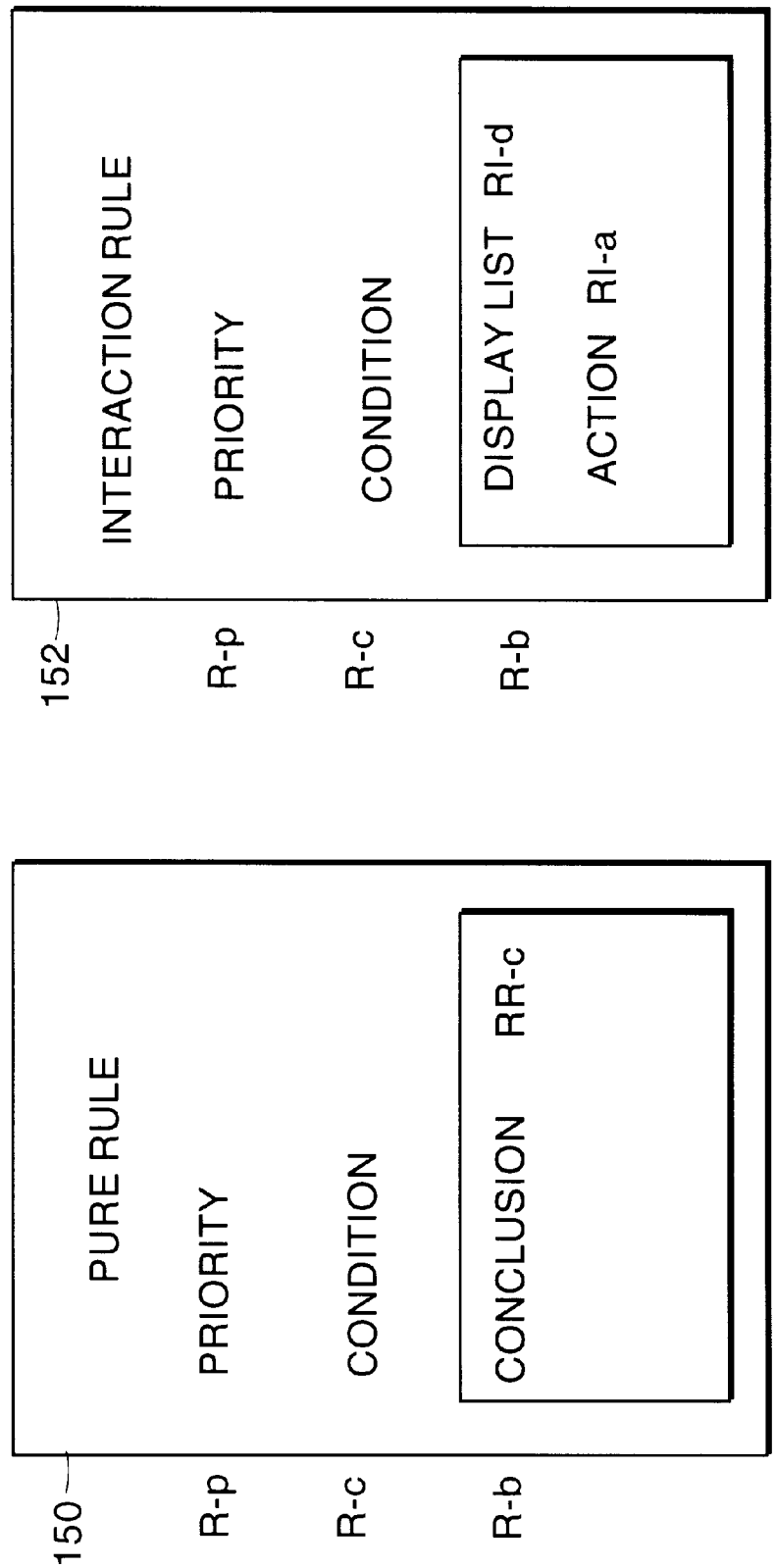
FIG. 3A illustrates the rules used in the discovery and publication of information according to one embodiment of the invention.

Referring to FIG. 3A, the dialog classes stored in memory modules 1 and 1' generally comprise at least two types of rules known as pure rules 150 and interaction rules 152. As shown in this figure, pure rules 150 and interaction rules 152 are characterized by a priority value, such as, for example, an integer from 1 to 11, given by R-p. It is to be appreciated that any method of assigning differing values to a plurality of rules can be used, as the priority value is simply a value that can be ranked against the priorities of other rules to determine the order in which the rules are selected. Both the pure rules 150 and the interaction rules 152 further include a condition, given by R-c. A condition is a Boolean operation that results in an output that is either true or false. Both types of rules are configured in accordance with the objectives of the sender 4 in determining when the user 7 should be prompted for facts, what strategy should be employed in prompting a user 7 for facts and what suggestions should be made to the user 7 on the basis of such facts.

Pure rules 150 further include a body, given by R-b, within which a conclusion, RR-c is found. Pure rules 150 incorporate the logic of the sender 4 using information already available to the DEP 14. That is, pure rules 150 are executed on the basis of existing private and public facts and do not rely on direct interaction with the user 7 for their execution. For example, a pure rule 150, can include a timer, and include the condition that if more than a month has passed without effective interactions with the user 7, the user 7 is no longer of interest to the sender 4. The interaction rules 152 incorporate the logic of the sender 4 to prompt the user 7 for information, elicit and record private facts, such as, requests for orders or comments, or present information to the user 7. For example, if private facts indicate that the birthday of the user's son is next week and his preference for toys is trucks, an interaction rule 152 can propose to the user 7 that she order a toy truck. After an answer is given, the private facts derived from the answer can then be stored in memory module 6. As a further example, if a user 7 has expressed her interest in buying some products, an interaction rule 152 can present the user 7 with a request to disclose such a fact to the sender 4 or provide the user 7 with the necessary information to procure the goods independently of the system.

Interaction rules 152 are similar to pure rules 150, with the exception that the body RI-b of an interaction rule 152 is further divided into a display list, given by RI-d, and an action, given by RI-a. A display list RI-d defines the query presented to the user 7 through the user interface 15. The action RI-a, is a function that is carried out after obtaining a response from the user 7 through the user interface 15. A response can include a final decision to proceed, such as yes, no, or time-out, as well as a list of data items. Data items can include orders, order requests, information and comments. An order is a contract between the user 7 and the sender 4, and because it requires mutual agreement, requires use of the transaction network 10 and the transaction computer 11. On the contrary, the order request is presented to the user 7 and can be elicited by the DEP 14 without requiring any knowledge by the sender 4. Transforming an order request into an order can be done with proper disclosure by the user 7. Another example of a data item can include a comment such as, "I'm done" or "Show me model xyz." The action RI-a of an interaction rule 152 explicitly defines a list of possible outcomes, indexed by the user decision, and for each outcome, can make changes to private and public facts based on the decision and the data items collected. Examples of interaction rules 152 are further described in connection with FIGS. 6A–6C and FIGS. 7A–7C. It is to be appreciated that such interaction rules relate to publishing requests, which are a subset of the types of interaction rules employed by the system, and therefore are not to be construed as limiting. Rather, the present invention provides that interaction rules can encompass any query having the above-described elements.

The condition R-c again reflects the appropriateness of posing the question to the user 7. For example, a typical condition will include a check as to whether the result of the question is not known and the action RI-a for the question will include recording the answer to the question provided by the user 7. If the user 7 refused to answer explicitly, or implicitly via the time out 32, the action RI-a for the question will include recording a "no answer" response.

Figure 4:
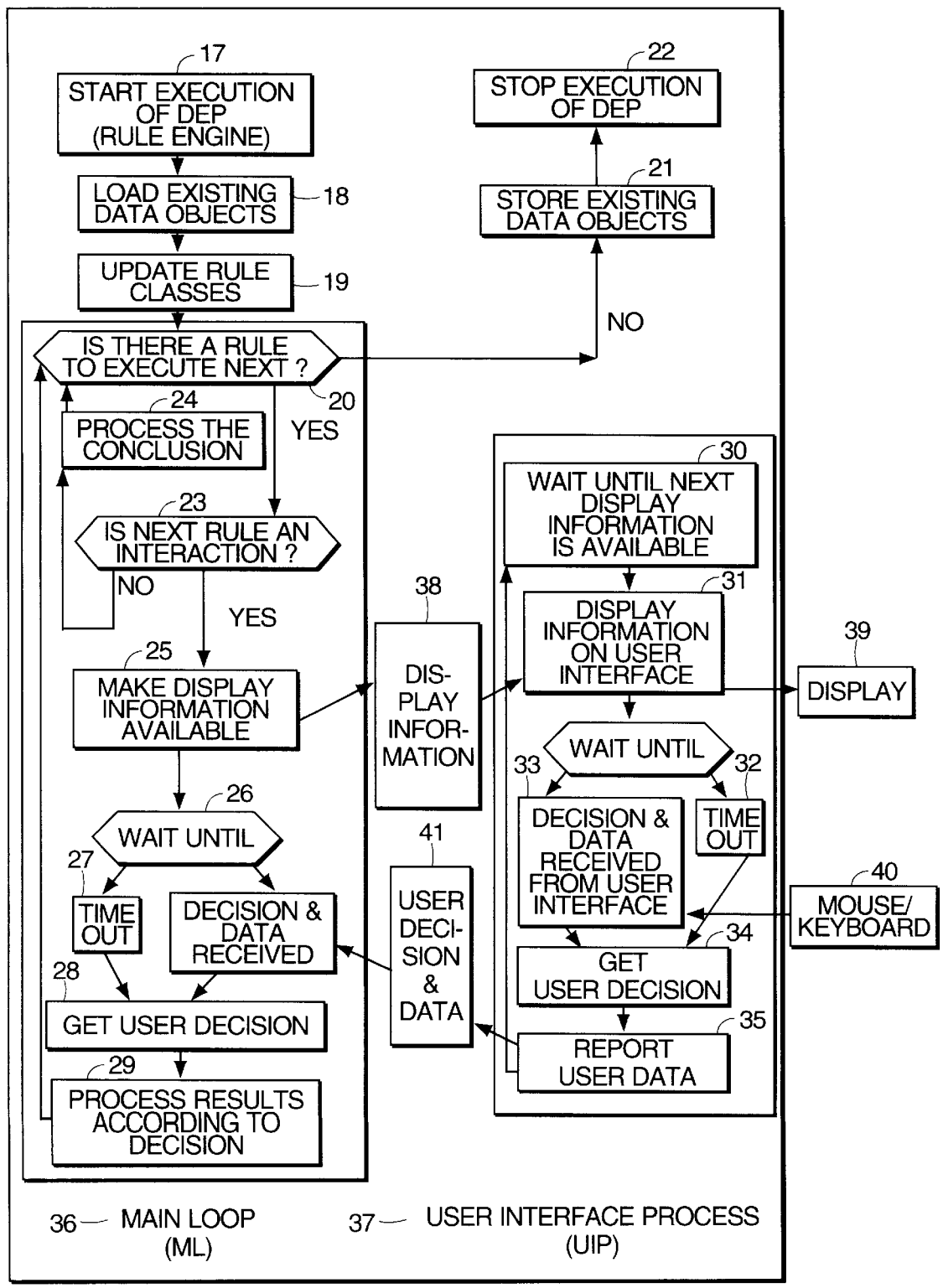
FIG. 4 is a flow chart describing a method of discovering and publishing facts according to one embodiment of the present invention.

Referring now to FIG. 4, the DEP 14 commences execution of the dialog classes in main loop 36 hereinafter "ML" 36. In step 17, the dialog classes 1' are executed in response to the start up sequence of the interface computer 5 or in response to an explicit request from the user 7 who desires to interact with a sender 4. The DEP 14 then proceeds in step 18, to load existing data objects. The data objects can include private facts previously discovered by the DEP 14, along with a version of previously disclosed private facts that are now considered public facts. Additionally, the data objects can include inbound public facts associated with the sender 4, as described above. The DEP 14 further proceeds in step 19 to update the local copies 1' of the dialog classes 1 with copies of the dialog classes 1 transmitted over the distribution network 3. The manner in which the update is implemented can depend upon the characteristics of the distribution network 3. Two-way networks such as the Internet allow the distribution to be on-demand demand and under the control of the DEP 14, whereas with one-way networks, such as a digital television broadcast, the interface computer 5 can be used to provide a buffer.

In step 20, the DEP 14 enters an execution loop 36 by selecting the next rule to execute, if a next rule exists. As described above, pure rules 150 and interaction rules 152 are characterized by a priority value, such as, for example, an integer from 1 to 11. The priorities can be used by the DEP 14 to determine in step 20 which rule to select for initial processing. The process of rule selection in step 20 can be performed by the DEP 14 in a variety of ways, as further described in FIG. 5. Should no rule exist, such as, in the case where the user has indicated that he/she no longer wishes to interact with the interface computer, and the applicable pure rules 150 interpret such an indication and enter a state where no interaction rules 152 will be executed, the DEP 14 proceeds out of the ML 36, to step 21. In this step, the DEP 14 stores updates for existing data objects representing the private and public facts. Control is then routed to step 22 where the DEP 14 terminates execution.

Returning again to step 20, if there is a rule to execute, the DEP 14 determines whether the rule selected is an interpretation rule 152. Use of object-oriented language features such as the Java "overriding" feature can make step 23 implicit. If the rule selected in step 20 is a pure rule 150 RR, the DEP 14 executes the rule in step 24 and processes the conclusion RR-c of the rule. If it is an interaction rule 152 RI, the DEP 14 activates, in step 25, the display list RI-d of the rule, which makes information available to a user interface processing loop 37, referred to as the "UIP" 37, as provided in step 38. The UIP 37 increases the reliability of the ML 36 by shielding the ML 36 from the user 7 and the user interface 15. In this manner, mistakes made by a user 7 while interacting with the UIP 37, i.e. system crashing, will not adversely affect the ML 36. As shown in this figure, the UIP 37 is initially in a waiting period, in step 30, until information is made available in step 25 for display to the user 7 by the UIP 37 in step 31.

The UIP 37, previously in a waiting period in step 30, processes the interaction rules 152 in step 31, and provides prompts to the user 7 in a format that is acceptable for display 39 at the user interface 15. The UIP 37 then waits until either a set amount of time has elapsed, i.e., a time-out 32, or until the user data 40 comprising a user response and optionally, a plurality of data items, is received by the UIP 37 in step 33. The time-parameter in step 32 is taken as an implicit decision by the user 7 to avoid responding and is encoded with a value of "0." A response provided by a user 7 can include selecting a preference from the display list, completing a form provided to survey sociodemographics, providing a yes or no response to a proposal to access the sender 4, or indicating authorization of a request by the sender 4 to publish private facts. User responses for a given interaction are typically indexed by strictly positive integers.

While the UIP 37 is interacting with the user 7, the DEP 14 waits, in step 26, until the expiration of a predetermined time period, or alternatively, the DEP 14 waits, in step 27, until a response from the user 7 is received. As similarly described above, the expiration of a predicted time period in step 26 is taken by the DEP 14 as an implicit decision by the user 7 to not respond to the display list, and a time-out parameter is encoded accordingly, and is given a value of "0". In the event that a user 7 has supplied a response and any additional data, the response is transferred from the UIP 37 to the DEP 14 in step 41.

Upon transfer of the response to the DEP 14, the DEP 14 calls, in step 29, the action RI-a of the associated interaction rule 152 (or rules), to perform the action that results from the user 7 response. For example, depending on the user 7 response, the action performed can be, for example, recording a data item associated with the response as a private fact in memory module 6 or setting a flag for prompting the user 7 with a an appropriate suggestion. After processing the user 7 response, control is passed again to step 20, and the DEP 14 selects the next rule to execute.

If the user 7 does not respond to the UIP 37, that is, if the user 7 does not take one of the explicit decisions expected by the rule RI, the UIP 37 will report a time out in step 32. Similarly if an error occurs between the user interface 15 and the UIP 37, or between the UIP 37 and the ML 36, the ML 36 will experience a time out in step 26. In both cases, a user response is reached implicitly, as the lapse of time or a user response triggers an outcome for which an interaction rule 152 provides a conclusion. Furthermore, upon reaching a time out in step 26, the ML 36 can check the continuing availability of the UIP 37 and restart the UIP 37 without losing any data, except possibly the user data for the interaction rule 152 where the error occurred. In the event that a user response is received before the time out period has expired, the UIP 37 processes the user data in step 40 into a format acceptable by the ML 36 and reports it to the ML 36 in steps 35 and 41. The UIP 37 then returns to step 30 and enters into a waiting period until new information is again made available for display to the user 7.

The particular values of the time out periods given in steps 26 and 32 can be arrived at in a variety of ways, taking into consideration such variables as the amount of time the sender 4 wishes to allow the user 7 to respond, the typical response time of a user 7 generally, or the typical response time for answering certain questions. The value of time out for step 26 can be determined as a constant of the ML 36 and the value of time out in step 32 or can be a variable dependent on an interaction rule 152. In one embodiment, the value of the time out for step 32 can be determined by the sender 4 and passed to the UIP 37 within the display information in step 38. It is preferred that the time out in step 26 be greater than the time out in step 32 with added processing time. In this manner, the ML 36 allows at least the same amount of time that the UIP 37 allows for the user 7 to respond, such that the ML 36 does not ignore a response reached by the user 7 and accepted by the UIP 37. Conversely the UIP 37 can further display a "waiting" screen to alert the user 7 when no response is requested. During such time, the ML 36 can execute a derivation of pure rules 150, and therefore need not be processing an interaction rule 152 requiring a user response.

As described above, the DEP 14 has access to the private facts and the public facts throughout the execution of the ML 36. However, the creation and updating of public facts, i.e., writing, can be restricted in a number of ways. In the present embodiment, the ML 36 can write the outbound public facts only through a number of fixed rules, which, in the Java language, are referred to as "final classes." Final classes cannot be superseded by subsequent updating of dialog classes, such as the updating that occurs in step 19 when the DEP 14 receives from the operating system 13, the dialog classes from storage module 1. It is to be appreciated that the number of such fixed rules can vary depending on the particular application. As described above, public facts that are considered inbound public facts are further restricted, and cannot be written by the DEP 14, but rather originate from the EPR 16 and the sender 4.

The DEP 14 can act as an engine that limits outgoing information to facts explicitly approved by the user 7 for publication or acknowledgment signals responsive to external events, such as special requests originating from the user 7 or the sender 4, as will be further described. Protection mechanisms of object-oriented languages, such as Java's "final", "protected" and "private" attributes, and its "package" feature, can aid in preventing the unauthorized disclosure of private facts. These mechanisms separate the rule engine such as the DEP 14, together with a set of bundled rules from a sender-dependent rule set with restricted privileges. Such protections can be used in conjunction with methods known to the expert in the art, such as encryption, to further prevent the unauthorized use of local recording of data objects including the private facts, the unauthorized listening of interactions with the user, and the unauthorized access to private facts due to implementation flaws in the protections provided by the languages used to encode the DEP 14 and UIP 37, and the OS 13, the user interface 15 and the distribution network 3.

In an Internet-based implementation of the present invention, the user interface 15 can be a browser such as Netscape Navigator and the DEP 14 can be implemented as a trusted Java applet. In another embodiment, should trusted applets not be acceptable to the browser, a local Internet server can be associated with the interface computer 5 such that the DEP 14 is implemented as a stand-alone Java application running behind the server. In this embodiment, the user interface 15 can functionally be the combination of a local server and a browser. In still another embodiment, the Internet can be used for the distribution network 3 only and the DEP 14 and the user interface 15 can be implemented as stand alone Java applications.

The system of the present invention can be implemented independently of the exact nature of the memory modules used to record the private and public facts. In one embodiment, a removable, portable medium such as a 3.5 floppy disk or a "smart card" can be used. By removing confidential data from the memory modules associated with the interface computer 5, the user 7 can interact with the sender 4 or an agent for the sender 4 using any computer. Additionally, by using the authentication feature of smart cards, the DEP 14 can positively identify one representing the user 7. In an alternate embodiment, the smart card can include part of the interface computer 5 functionality, such as, for example, the smart card can store and run the classes defining the DEP 14 to the exclusion of the UIP 37, reducing the steps 18 and 21 to trivial steps, while the computer 5 would run the UIP 37 and the external processes 16.

Figure 5A:
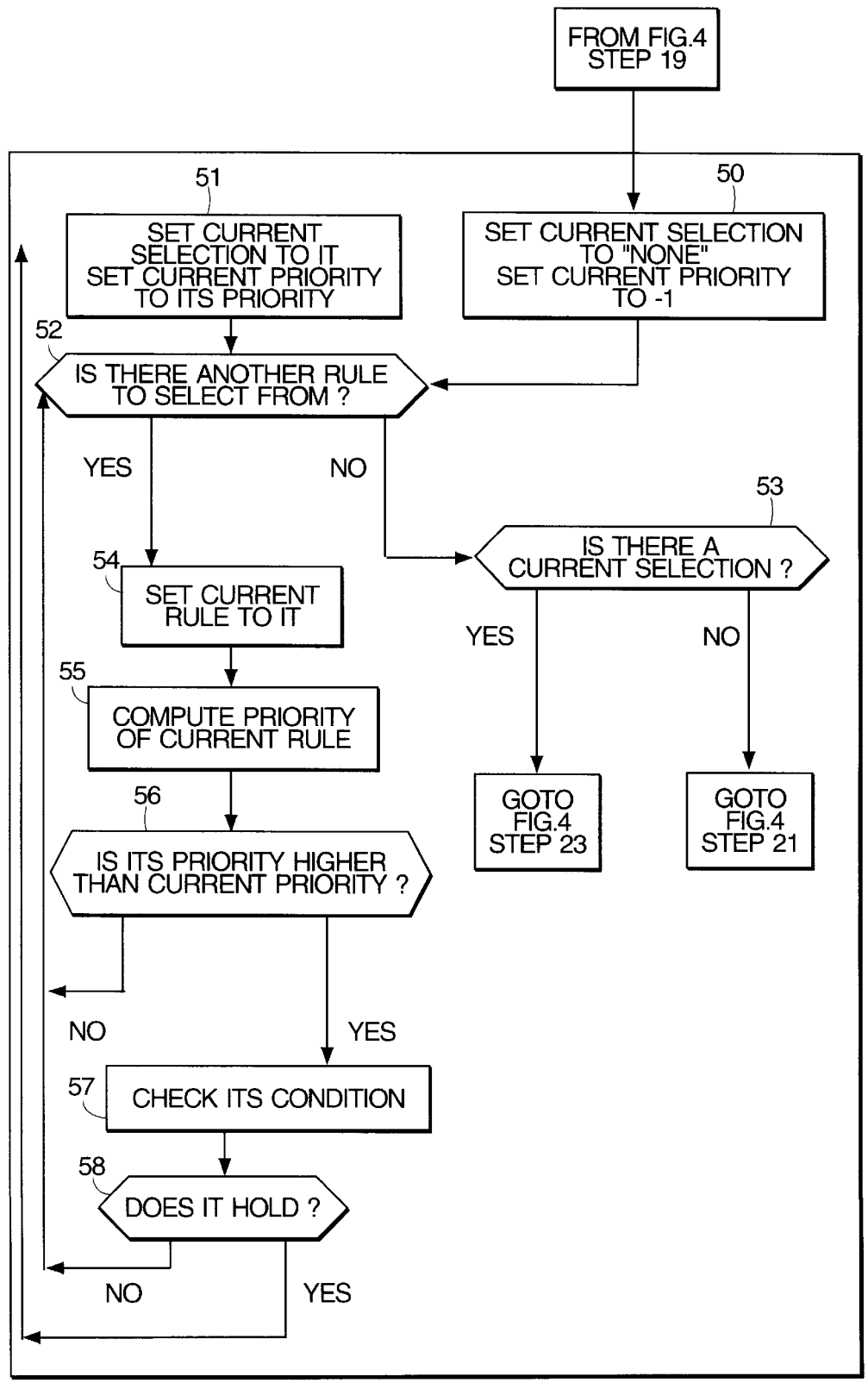
FIG. 5A is a flow chart illustrating rule selection in the discovery, exploitation, and publication process.

Referring now to FIG. 5A, shown is a flow diagram describing, according to one embodiment of the invention, the manner in which rules are selected. As shown in step 50, the DEP 14 initially sets the "current selection" to "none" and the "current priority" to "−1". By initializing the current selection in this manner, the DEP 14 can determine, based on priorities, whether other rules are available for selection, as in the present embodiment, the priorities of the rules can be integers between 0 and 11. The DEP 14 then checks, in step 52, whether there is another rule to select from, assuming all rules comprising the dialog classes are being held in an ordered list. If no other rule is available, that is, the selection has been completed, the DEP 14 checks, in step 53, if the "current selection" is a rule. If the "current selection" is a rule, the DEP 14 selects it and proceeds to FIG. 4, step 23. If the "current selection" thus remains "none", the DEP 14 proceeds to FIG. 4, step 21 and existing data objects are stored. If, in step 52, another rule is available, the DEP 14 sets in step 54, the "current rule" to it and proceeds to compute the priority R-p of this rule in step 55. The DEP 14 then compares in step 56, the computed priority R-p to the "current priority" to determine whether the "current rule" should be selected first for processing. If the computed priority R-p is not higher than the "current priority", the DEP 14 loops back to step 52 and the DEP 14 determines if there is another rule to select from. Of course, upon initial processing through the loop, all rules will have a priority higher than −1, the initially set "current priority".

Where the computed priority is higher than the "current priority", the DEP 14 checks, in step 57, the condition R-c of the "current rule", to determine whether the condition holds, that is, whether it can be satisfied, as given in step 58. For example, if the rule has a condition, such as, "the user enjoys reading," the condition is satisfied if "user preference: reading" appears in the private facts currently held in the memory module 6. If reading does not appear in the list of private facts, then the condition cannot be satisfied, and is considered false. If the condition is true, the DEP 14 sets the "current selection" to the current rule and the "current priority" to the priority of the current rule in step 51. By making such settings, the DEP 14 notes that this rule is the best candidate for execution because the rule's condition is satisfied and the rule has the highest priority of the rules encountered thus far. The DEP 14 then loops back to step 52, and the entire process is repeated again to determine the priority and conditions of other rules compared to the "current selection" to determine the rule that should be selected for initial execution. If the condition is false however, the DEP 14 immediately loops back to step 52 to determine whether another rule is available to select.

Figure 3B:
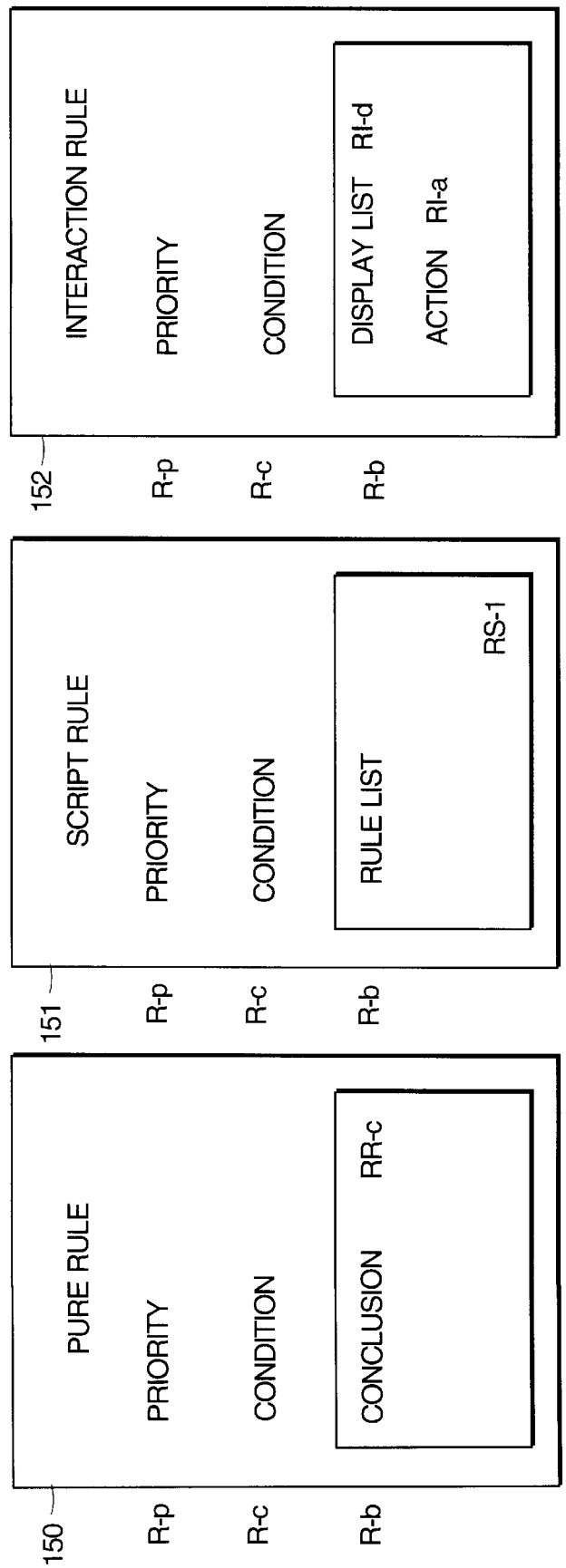
FIG. 3B illustrates the rules used in the discovery and publication of information according to another embodiment of the invention.
Figure 5B:
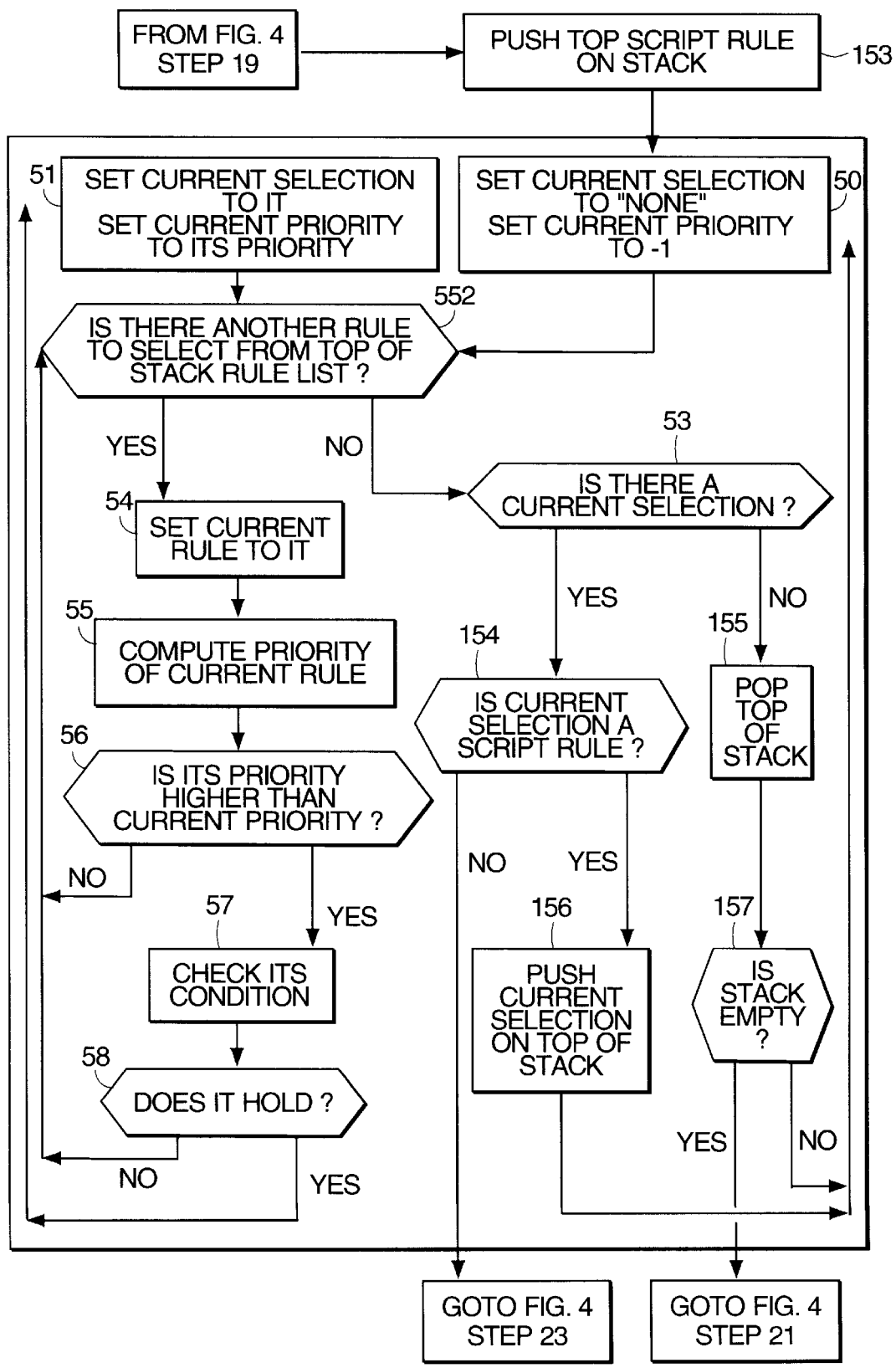
FIG. 5B is a flow chart illustrating rule selection in the discovery, exploitation, and publication process.

It is to be noted that, in other embodiments, additional or fewer rules can be used. For example, in another embodiment a third type of rules, referred to herein as script rules, can be used. Referring to FIG. 3B, script rules 151 include a body, given by R-b, within which a rule list, RS-1 is found. Script rules 151 can be used to structure the set of interaction and pure rules into small related subsets, as defined by their rule lists. In this manner, step 20 of FIG. 4 can process the related subsets rather than process the entire rule set at once. As further illustrated in FIG. 5B, step 52 of FIG. 5A is shown now as step 552, which restricts the selection of a rule to the list of the current script rule 151. FIG. 5B further includes the selection of the current script rule. Assuming for example, that the rule list of a script rule 151 can contain other script rules 151 and that all rules belong to the list of some script rule to the exception of a unique hierarchical "top script rule", steps 153 to 157 implement a stack-driven selection algorithm, which can be implemented with programming techniques available to those of ordinary skill in the art.

Referring now to FIG. 6A, shown is a publishing request list 60 representing the results desired by the sender 4 in response to the sender's interaction strategy. The publishing request list 60 is created by the ML 36 during execution of the dialog classes, and can comprise an auxiliary data structure having an ordered sequence of requests that comprise name 61 and value 62 pairs. Each individual publishing request represents an attempt by the sender 4 to obtain a fact previously discovered about the user 7, that is, to obtain a publication of a private fact 6. For example, a publishing request list 60 can include, a request by a sender 4 that the user 7 disclose a hair color, where the sender 4 is a hair dye company conducting a market research, or a request to disclose a book preference sought by a book publisher. For example, where a sender is a hair dye company, a publishing request list can be created where name 61 can be "hair color" or "hair-coloring products," whenever values 62, such as "brown" or "highlights" are discovered as a result of a user 7 disclosing a private fact. The publishing request list 60 acts as a buffer between the dialog classes 1, 1' described above, that govern the discovery of private facts from the user 7, and the system's pure 150 and interaction rules 152 that control the granting of disclosure, that is, the publication of the private facts as public facts to the sender 4.

Private facts can be designated as outbound public facts that are available to the sender 4 generally only when the user 7 so authorizes. These private facts are implemented, for example, as a hash table 63. In the hash table 63 each private fact is cataloged by the name of the fact 64, referred to as the 'key' of the hash algorithm, and parameters 68 of the hash algorithm. The parameters 68 comprise a permission status 65, which can take the values of "authorized", "denied" or "system". In the present embodiment, authorization to publish cannot be obtained without an explicitly positive, informed decision by the user 7. The parameters 68 further include the date of last access 66, that is, the date that the user 7 last decided whether to publish the private fact 6, and a value 67, that is, the content of the private fact 6. Therefore, continuing with the example above, the name can be "hair color," the permission status can be "authorized", the date of last access of the publication request by the DEP 14 can be "1/1/97 at 2 p.m.", and the value can be "brown." In this example, the outbound public fact 8 is shown by the hash table 63 as a private fact that was previously discovered and made available for publication to the sender 4.

One of the fixed rules determining the action to be accorded to a sender's 4 publishing request is shown in FIG. 6B. The rule described in this embodiment can be when a publication of a private fact is requested for the first time. As shown, this rule has a priority R-p 200 of integer 11, which, in the present embodiment is one higher than the priorities given to other rules, which typically have a maximum priority of 10. The condition 202 R-c requires that the publishing request list 60 is not empty, that is, the sender 4 is requesting disclosure and publication by the user 7. An additional condition is that the name 61 of the first element of the list 60 is not listed in the hash table 63, that is, an attempt to publish the private fact 6 has never been made. This rule is an interaction rule 152 whose display list RI-d 204 comprises a fixed screen layout asking for permission to publish this fact by referencing the name 61 and the value 62 of the element. As stated above, the name 61 can be "hair color" and the value 62 can be "brown." For example, a publishing request provided on a display list can ask: "Do you want to disclose that "your hair color" is "brown"?" A "no" answer would mean that the user 7 does not want the sender 4 to know her hair color and that hair color is to remain a private fact 6. A "yes" answer means that the hair color will now be a public fact 8, as well as a private fact 6.

The action RI-a 206 thus accepts three decisions as an outcome: "time out", "no" and "yes". The action RI-a 206 further creates a new entry in the hash table 63 with the name 64 equal to the name 61 in the publishing request list 60 and the date of last access 66 equal to the current date as given by the interface computer 5. In the cases of a "time out" or a "no" response, the action RI-a 206 fills in the permission status 65 with "denied", while in the case of "yes", the action RI-a fills in the permission status 65 with "authorized" and sets the value 67 in the outbound public facts table 63 as equal to the value 62 of the publishing request list. The action RI-a 206 a further removes the first element of the request list 60 such that the next request can be processed.

Referring to FIG. 6C, another interaction rule that can be used to carry out a publishing request is shown. This rule can be used when a request to publish a private fact has previously been denied, but the sender 4 still wishes to obtain knowledge of this private fact. This rule has a priority R-p 208 of 11, which again, is one higher than other rule priorities. The condition R-c 210 associated with this rule requires that the publishing request list 60 is not empty, that is, the publishing request list comprises a public fact 8 to be updated, and the name 61 of the first element in the list 60 is listed as the name 64 in an entry in the hash table 63, that is, some attempt to publish it has already been made and the permission status 65 corresponding to the name 64 is equal to "denied," that is, the attempt was unsuccessful. Its display list RI-d 212 is provided to the user 7 and seeks to overturn a prior refusal to publish a certain fact. Two parameters are provided to the user 7, that is, the name 61 and the value 62 of the first element of the list 60. Optionally, a third parameter can be the date of last access 66, which is the date of last refusal. As similarly described above, its action RI-a 214 accepts three decisions as an outcome: "time out", "no" and "yes". The action RI-a 214 thus updates the entry in the hash table 63 with the name 64 equal to the name 61 by setting the date of last access 66 equal to the current date as given by the interface computer 5. Then, in the cases of "time out" and "no", action RI-a 214 is nothing, while in the case of "yes", the action RI-a 214 is to fill in the permission status 65 with "authorized" and set the value 67 equal to the value 62 as described above. Finally, the action RI-a 214 removes the first element of the list 60 so that the DEP 14 can process the next request.

Referring to FIG. 6D, another rule for processing a publishing request is described. Unlike the rules described above in FIGS. 6B and 6C, this rule is a pure rule 150, that is, the request is automatically fulfilled without requiring user authorization. In this rule, authorization is not required because the fact has previously been published by the user 7, and execution of this rule simply fulfills the publishing request by providing the most recent value of the public fact 8 to the sender 4. That is, a version of the public fact was given, and a new or updated version is requested by the sender 4. This rule also has a priority R-p 216 of 11. The condition R-c 218 associated with this rule requires that the publishing request list 60 comprise a public fact 8 to be updated, and that the name 61 of the first element of the list 60 is listed as the name 64 in an entry in the hash table 63. As described above, this signifies that some attempt to publish it has already been made. Additionally, the permission status 65 corresponding to the name 64 must be equal to "authorized," that is, the user 7 previously authorized disclosure of the public fact to a sender 4. The conclusion RR-c 220 associated with this rule updates the entry in the hash table 63 with the name 64 equal to the name 61 in the publishing request list 60 by making the conclusion date of last access 66 equal to the current date of the interface computer 5. Then the conclusion RI-c 220 sets the value 67 equal to the value 62 in the publishing request list 60. Finally, the conclusion RI-c 220 removes the first element off the list 60, again, so that the DEP 14 can process the next request.

As provided by the rule-selection process described in FIG. 5, rules having high priorities are processed ahead of rules with lower priorities. Each time a request to publish a private fact 6 is placed in the request list 60, the request is immediately examined using one the three rules described in FIG. 6B, 6C and 6D. Moreover, assuming the selection of one of the three rules in step 51, the rule cannot be surpassed by another rule in step 56 due to the high priority of 11 accorded to each of the three rules. Additionally, where a rule has not yet been selected upon initial processing by the DEP 14, at least one of the above described three rules examined in step 57 satisfies step 58. In this step, a determination is made as to whether the rule holds, that is, whether the action or conclusion associated with the rule can be executed because the condition associated with the rule is satisfied. If the rule holds, the rule is then selected in step 51, and the "current priority" is set to the priority of the rule.

Whenever the sender 4, through the EPR 16 desires to determine the value of a particular outbound public fact 8, the EPR 16 determines the name 61 of the fact as it was placed in the publishing request list. In this regard, the EPR 16 first determines whether the DEP 14 is running. For example, if no rules are available for execution, the DEP 14 is inactive and the sender 4 cannot obtain publication of the fact 8. If the DEP 14 is running, the EPR 16 then determines whether the name 61 is present as the name 64 of an entry in the hash table 63. If a name 64 is present, the EPR 16 obtains the date of last access 66, which is the date that the entry was last updated by the DEP 14 and, if the permission status 65 is "authorized", the EPR 16 obtains the value 67 for the entry. It is important to note that the date of the last update may be a useful tool in providing context to time-sensitive facts. For example, if the user previously provided a public fact "I'll buy stock ABC" the sender 4 would want to know whether this public fact was last made available before or after a rise in stock price.

In the context of a simple exchange protocol such as Internet http, the names 61 and 64 can be best represented as a text string and the values 62 and 67 can be limited to simple data types, such as a number or a text string. The values 62 and 67 can further be represented by more complex objects. For example, a sender 4 can use a complex object to encompass a number of private facts that are of interest to the sender 4. Where a more complex object is used, the user interface 15 can provide in the display information 39, the inner content of the value 62, that is, the information within the object. For example, if the object is "address," the values obtained can include the street, the house number, the city, the state, and the postal code. In this manner, when asked to disclose the private facts included under the complex object, all private facts previously disclosed and relating to that object are made known to the user 7. That is, the inner content of the value 6 is shown on a display list. By receiving the inner content of the value 62, the system guarantees that the user's 7 decision regarding publication is truly informed, as the user 7 is able to view responses previously given but possibly since forgotten. In an alternative embodiment, the UIP 37 can transform the value 62 from a complex object received within the display information 38 into a series of text strings in step 31. Such algorithms are known to those of ordinary skill in the art as a common function of object oriented languages.

In another embodiment, should the DEP 14 not be running, the EPR 16 can be granted permission to load and read existing data objects representing the outbound public facts into a hash table (not shown) similar in structure and purpose to the hash table 63. Also, to protect the accuracy of updates, the rules can take the current date from the distribution network 3 rather than the interface computer 5, as the distribution network 3 can often carry a more accurate current date and can deliver a date on demand. In another embodiment, the outbound public facts table 63 includes a copy 69 of the data objects including a name 64, date of last access 66 and a value 67. The copy 69 is made in the present embodiment only for those names 64 for which permission status 65 is not denied. By restricting access by the EPR 16 to a copy 69 rather than to the structure 63, one keeps confidential the refusal by the user 7 to disclose a specific private fact 6. Finally an improved level of control can be given to the user 7 by allowing the user 7 to cancel an authorization previously given during the interactions as described in FIG. 6B or 6C.

Referring to FIG. 6E, authorization cancellation can be implemented by a fourth pure rule with the DEP 14. In this embodiment, a rule having a priority R-p 222 of 11 allows a user to cancel previously given authorizations to publish private facts. The condition R-c 224 associated with the rule can be that a time period has elapsed or that a special request has been set. A time period can be, for example, a month or a quarter of the year. For time-sensitive private facts, those being private facts that are quickly subject to change, the time period can be significantly shorter, such as, for example, a week. The expiration of the time period can be measured through the use of a clock or "chronometer" object which can access the current date with the desired accuracy and determine the amount of time that has elapsed since initialization of the date. In this manner, regular checks can be made on a user's authorization to disclose a private fact 6. A special request can be, in the present embodiment, an affirmative step taken by the user 7 to initiate cancellation of previously given authorizations. An affirmative step can be signaled for example, by the user 7 clicking on an icon or touching an icon on a touchscreen, which represents an authorization for cancellation. As shown, the conclusion 226 resets the authorization time as well as the authorization cancellation request, obtains the current date, updates each entry in the outbound public facts table 63 with permission status 65 "authorized" to "denied", and changes the date of last access 66 to the current date. In this manner, the private facts previously authorized for publication are no longer available as public facts. While the rule in the present embodiment issues a blanket denial of previously given authorizations, in other embodiments, the system can use a plurality of similar rules with more specific targets for cancellation of only certain authorizations.

Where a time period has expired or a user has taken an affirmative step to cancel, and a special request is sent to the DEP 14, the value 67, that is the private fact, remains in the outbound public facts table 63, and thus is still available to the EPR 16 for publication to the sender 4. Although the value is available to the sender 4, publication of the current version of the fact is not breached, that is, as the value 67 is no longer guaranteed to be current. In another embodiment, where the user 7 does not want the sender 4 to know that denial of a previously given authorization has occurred, nor to have access to possibly outdated values 67, the EPR can be restricted to the copy 69 as described above.

In another embodiment of the present invention, suggestions in the form of interaction rules 152 RI can be made to the user 7 based on private facts known to the DEP 14, and inbound public facts sent by the sender 4. A suggestion is simply the exploitation of the discovery of private facts. A suggestion uses existing private facts to prompt the user into entering into a transaction with the sender, either through the disclosure of a certain important public fact to be relayed by the EPR 16 for publication to the sender 4, or through independent channels such as provided by e-mail, telephone, mail, shops. In this manner, the display list RI-d associated with the interaction rule RI-a 152 is directed to the user 7 when the condition R-c is met. The condition R-c of the interaction can be a compound statement including checks on past interaction history by reviewing the outbound public facts table, current circumstances known to the DEP 14 such as the date, time of the day, private facts and inbound public facts. The priority R-p of the suggestion can vary according to the importance of the outcome, positive or negative, taken by the user 7. A typical action RI-a for the suggestion includes making entries into the publishing request list 60 to finalize disclosure and storing private facts associated with the user's reaction to the suggestion for future reference.

Before making suggestions, it is often necessary to execute additional interaction rules 152 that ask a series of preliminary questions. Such questions are embodied in interaction rules 152 RI presenting a display list RI-d of one or more questions that are asked of the user 7 when a condition R-c is met. The questions thus allow for the discovery of private facts that can lead to suggestions. For example, suppose the dialog classes include the following interaction rules 152:

If attribute A=color of one's hair and is not known, ask about attribute A; and

If attribute B=hair color products used and is not known, ask about attribute B.

If attribute A is brown and if attribute B is Clairol® highlights, then suggest to the user that he buy sender's highlighting products for brown hair.

The priority R-p for the interaction rule again reflects the importance of asking this question, and the priority of such an interaction rule 152 can vary in response to learning additional private facts about the user 7. For example, the priority of a particular interaction rule can rise as the answer to the question embodied in the interaction rule becomes the last unknown fact discovered before an important suggestion can be made. Referring again for purposes of illustration to the above example, once attribute A is known, the priority of obtaining attribute B may rise, as the only condition left to satisfy before making the suggestion, is whether the user 7 uses Clairol® highlights. Similarly, the priority of obtaining attribute B could be lowered if attribute A is unknown.

A derivation is a subset of pure rules RR, whose conclusion RR-c expands on the knowledge that can be obtained from a condition RR-c. For example, if the user likes mountain biking and reading, put "Best Mountain Bike Trails in Switzerland" in a suggestion entitled "Reading Recommendation List". The use of a derivation is typical of expert systems built on rule engines and is well known to the person expert in the art. It is a characteristic of this invention, earlier mentioned, that lengthy chains of derivations can be avoided when the user 7 is known to be present in front of the user interface 15. That is, pure rules 150 need not be processed to such an extent that interaction with the user 7 is absent for prolonged periods of time.

In another embodiment, the user 7 can be represented by a plurality of users 7. For example, what is considered to be a customer in a sender's marketing application, may in fact be a household or, in business to business cases, a plurality of employees in a receiving company. In such cases, it is advantageous to employ additional rules for dealing with a plurality of users 7. In one embodiment, a rule can be configured to include an action that requests positive identification against a previously initialized private fact list asked each time a "time-out" occurs or after a given period of time has elapsed. The occurrence of a "time out" or the expiration of a period of time can be checked as part of the condition R-c of the interaction rule 152. In light of the number of potential users, and the heightened possibility that publication of one users' private facts may inadvertently occur should another user have access to the same computer, the rule executing such a question can be given a high priority relative to the remaining rules. More stringent security measures can be developed to ensure that one user 7 cannot publish another user's 7 private facts. In still another embodiment, positive identification is requested only as a condition for making certain important questions or suggestions. In this manner, initialization is not needed and the positive identity of the plurality of the users 7 is itself discovered by asking questions and making some derivations to verify the answers obtained from the questions. For example, a typical question might ask for the first names of the members in the household, followed by a question on the specific role of the current user 7. Moreover, a key suggestion might not be put to the user 7 unless the user 7 has identified him or herself as a parent or a known adult.

The present invention provides both the sender 4 and the user 7 with a process to effectively exploit the user's 7 information and for the user 7 to maintain control over confidentiality. By construction, the user's control is maintained because no information relating to the private facts can be published without the user 7 giving an informed consent. Moreover, as described above, consent to publication can be granted or denied at any time, per fact disclosed, or per number of facts disclosed, thereby enabling the user 7 to exhibit control over the disclosure and publication of private facts. Similarly, the sender 4 can control the interaction, through the dialog classes 1, 1', configured to implement the communication strategy of the sender 4 and having unrestricted access to a user's private facts. To obtain publication of private facts the sender 4 deems relevant, the sender 4 can further use the dialog classes 1,1' to query the user 7 for increasing levels of publication, settling for the highest level of publication with which the user 7 agrees.

In another embodiment, each sender 4 can seek varying levels of publication from different users 7. A sender 4 can, for example, pursue maximum publication until the sender has gathered in central memory 10 a statistical representation of the types of users 7 and their interests, thereby avoiding the need to obtain further disclosure and thus minimizing data warehouse expense. In another embodiment, where a minimum level of publication by the user 7 is required, the EPR 16 can be an optional component of the system or need only be used to convey special requests originating outside of the interaction between the DEP 14 and the user 7, as further described in FIG. 7A. The outcome of the suggestions associated with the pure rules 150 and interaction rules 152 can therefore be limited to a potential future decision by the user 7 to interact with the sender 4 directly, rather than disclosure of public facts to the sender 4.

Where a higher level of disclosure to the sender 4 is desired by said sender, the EPR 16 can be configured with rules that further utilize the private facts listed as authorized in the outbound public facts table 63. For example, in one embodiment, the EPR 16 can find the appropriate entry in the outbound public facts table 63, and initiate a transaction with the sender 4 through the transaction network 12 with the transaction computer 11. The transaction can simply be the recording in the memory module 10 of the outbound public fact. It can also be a more complex transaction such as order placement, necessitating interaction with a user 7.

Referring to FIGS. 7A–7C, the format of a special request, according to one embodiment of the invention is described in further detail. As briefly described above, a special request is typically an event received by the EPR 16 that originates outside of the interactions between the DEP 14 and the user 7, such as, for example, a cancellation of previously given authorizations, as described above in FIG. 6E, or the notification of product specials by the sender 4. Both the EPR 16 and the DEP 14 can be configured to recognize such events as instances of the same "special request" class.

Referring briefly again to FIG. 2, the EPR 16 can receive a special request from a sender 4 via the transaction network 12, or from a user 7 via the user interface 15, and mediate between the originator of the special request and the DEP 14 to present the special request to the DEP 14. Moreover, a sender 4 can include an EPR 16 configured to communicate to the DEP 14, a plurality of differing sender-specific special requests. As discussed above in connection with FIG. 6E, a special request can result from the receipt of a request from a user 7 to cancel previously given authorizations. Additionally, a user 7 can initiate other special requests, such as, for example clicking on an icon indicating that the user 7 would like to place an order with a sender 4, or that the user 7 wishes to communicate directly with the sender 4. A sender 4 can initiate a special request to make the user 7 aware of a special product offer, special times to purchase, or certain product features. Such a request is typically determined after the sender 4 learns some private facts about the user, that is, has received outbound public facts corresponding to the publishing request list 60, and in turn has determined that the user 7 is of interest to the sender 4.

As shown in FIG. 7A, upon start-up of the DEP 14 and the EPR 16, a special request value 70 is initially reset, along with an inbound public fact SIG 71, and an outbound public fact ACK 72. The inbound public fact SIG 71 represents a special request from the EPR 16 to the DEP 14. The outbound public fact ACK 72, represents an acknowledgment of receipt of the inbound public fact SIG 71, and is sent by the DEP 14 back to the EPR 16. The associated parameter 70 is used internally by the DEP 14 to avoid delaying its acknowledging the receipt until after its taking the request into consideration. As shown, the outbound public fact ACK 72 is initially reset and the permission status in the outbound public facts table 63 is initialized to "system" such that the DEP 14 is set up to transmit such an outbound public fact ACK 72 when appropriate. Setting the permission status to "system" in the outbound public fact list reflects that this outbound public fact 72 is simply a message from the DEP 14, rather than a user-generated outbound public fact 8.

In the present embodiment, two pure rules 74, 76, as shown in FIG. 7B and FIG. 7C, can be used by the DEP 14 to execute a special request typically sent by the user 7 or the sender 4 through the EPR 16. As described above, a pure rule 150 has a priority associated therewith, which can be an integer. In the present embodiment, the priority 228, 234 of the pure rules 74, 76 is not given, but it is to be appreciated that the priority can be computed according to the intent of the request, for example, a special request seeking cancellation of previously given authorizations can be accorded a priority of 11, while a special request from a sender 4 can be accorded a similarly elevated priority or a lower priority, depending on the urgency of the request, as further described. The first rule as described in FIG. 7B, allows a special request to be taken into consideration while acknowledging its receipt immediately. As shown, it includes the condition R-c 230 that the inbound public fact SIG 71 is set and that the outbound public fact ACK 72 is reset. As for a conclusion RR-c 232, the special request 70 is set and the outbound public fact ACK 72 is set. In this manner, the special request sent by the EPR 16 or user 7 is flagged for subsequent processing, and an acknowledgment of the special request is provided by the DEP 14. It is to be appreciated that a special request cannot be set if the appropriate special request signal SIG 71 has not been set, received and acknowledged.

When, upon receipt of the acknowledgment signal ACK 72, the EPR 16 resets the special request signal SIG 71, pure rule 76, as described in FIG. 7C, can restore initial conditions to allow the next request to be received. It includes a condition R-c 236 that the inbound public fact SIG 71 is reset and that the outbound public fact ACK 72 is set. The conclusion RR-c 238 associated with this rule is that the outbound public fact ACK 72 is also reset. In this manner, both SIG 71 and ACK 72 are reset and ready to receive and act upon a new special request. It is to be appreciated that restoring the initial conditions does not convey that the request has been given due consideration, only that it is possible to receive a new request signal. The outbound public fact ACK 72 is therefore only the acknowledgment of the inbound public fact SIG 71.

When a special request is to be processed, it becomes necessary for the EPR 16 to interrupt the normal processing of the DEP 14. Therefore, in response to the initiation of a special request, the EPR 16 first sets the inbound public fact SIG 71 in the memory 9. After the rule 74 is executed, the special request may be processed by the DEP 14 according to the dialog classes in memory module 1'. As illustrated in FIG. 7B, the execution of rule 74 is necessary for the DEP 14 to acknowledge the interruption, that is, to acknowledge receipt of the special request. The EPR 16 can then reset the inbound public fact SIG 71 when the outbound public fact ACK 72 in memory 8 is set. And, as illustrated in FIG. 7C, execution of rule 76 by the DEP 14 can restore initial conditions as it resets the outbound public fact ACK 72.

In the present embodiment, the creation and initialization of objects for the public SIG facts 71 and ACK 72 and the rules shown in FIG. 7B and 7C are part of a fixed "special request" class bundled with the EPR 16 and DEP 14. The inbound SIG 71, as stated above, is a signal that allows the EPR 16 to originate communication with the DEP 14. The DEP 14 simply sends back an acknowledgment signal ACK 72 to indicate receipt of the special request. Thereafter, the DEP 14 processes the request, and the EPR 16 has no further involvement. It is to be appreciated that the outbound public fact ACK 72 cannot be used to secretly publish the private facts without the user's 7 consent, as the outbound public fact ACK 72 would only be sent in response to the inbound public fact SIG 71 comprising the special request.

To further illustrate the processing of a special request, a sender 4 can offer a product at a certain special price each month, and the user 7, when interacting with the DEP 14, can be prompted to determine the user's interest in the special. Interaction rules 152 can therefore be configured with reference to an inbound public fact representing the product price of the month. For example, interaction rules 152 can include conditions such as if the user 7 is of interest to the sender 4, and a special, but temporal, product offer is available by the sender 4, then make such an offer to the user 7. By setting the inbound public fact 71, the EPR 16 can, at the beginning of a given month, trigger rule 74 such that the DEP 14 is contacted and the user 7 is prompted. Given acknowledgment from the DEP 14 by rule 74 setting the outbound public fact ACK 72, the EPR 16 can then reset the inbound public fact SIG 71 allowing the DEP 14, through the execution of rule 76 to allow the cycle to repeat itself the following month.

Referring to another embodiment of the present invention as shown in FIG. 8A and 8B, often a sender 4 wishes to receive publication of private facts discovered in response to a user answering a series of questions. Referring again briefly to FIG. 6B through 6D, interaction rules 152 can be used to compile in the hash table 63 all public facts associated with the sender's questions. In the present embodiment, a questionnaire can be used to implement intermediate levels of disclosure. As shown in FIG. 8A and 8B, interaction rules 152 can further be used to create an entry in the hash table 63 comprising outbound public facts in the form of a score obtained in response to a user's answers to a questionnaire.

Referring now to FIG. 8A, a questionnaire is a private fact class made of a fact list 80 and of a total score to date 86. For example, the questionnaire can prompt the user 7 with a series of questions, and rate the answers provided and compute a score representing a desirability index. The score can then be compared to one or several given thresholds. As shown, the fact list 80 is made of an elementary private fact name 81, a list 82 of value 83 and note 84 pairs, and a note to date 85. For example, where the sender 4 is an electric utility company and the user 7 uses gas for heating and is probably likely to change his source of heat, the following questionnaire can be provided with the following thresholds and values:

Fact List: Source of Heat
common: 0, other: 0, wood: 1, fuel: 2, gas: 3, electric: 5→score to date: 3
Fact List: Likely to Change
not: 0, little: 1, probably: 3, absolutely: 6→score to date: 3
Total Score to Date: →6
Thresholds for Response to Total Score to Date:
2 and below: do not pursue;
3 to 7: engage relationship;
8 and above: pursue quickly As shown, the user 7 can provide information relevant to a questionnaire and a score can be given. The score can be compared by the sender 4 to a threshold indicative of whether the user 7 should be pursued.

Moreover, the private facts can be saved and updated by the DEP 14. For example, should the conclusion RR-c or the action RI-a of a rule modify a particular elementary private fact associated with the questionnaire, an update method 87 associated with this questionnaire is called by the DEP to ensure this private fact has been modified on the questionnaire. Referring to the example above, should the user 7 indicate that his source of heat is electric, the system would note the change from gas to electric in the fact list, proceed to update the note to date for "source of heat" from 3 to 5 and recompute the score to date. In so doing, the questionnaire can be retrieved with the name 81, and value pair list 82 of the elementary private fact list 80. The update method 87 proceeds to look up the name in the list 80 and, if the name matches name 81, to look up the value into the list 82. If the value matches the value 83, the note to date 85 is saved in a temporary value 88, replacing the note to date 85 with the note 84 corresponding to the name 81 and the value 83. The total score to date 86 is further updated by adding to it the algebraic difference between the note 85 and the temporary value 88.

Returning again to the above example, suppose that a user 7 is posed with a question resulting from an interaction rule 152 that asks whether the user's 7 response is likely to change and rather than answering "probably," a value given in the questionnaire in the example above, the user answers "absolutely." As the DEP 14 executes the corresponding action of the interaction rule 152, the DEP 14 records this change using the update method 87. In this manner, the value 6+6-3=9 becomes the note to date, as this value reflects that the user absolutely likes to change. This in turn can trigger further actions based on the subsequent comparison of this new total score to the above-described threshold values. Alternatively, the update method 87 can be implemented such that it is called periodically, for example, in response to a chronometer-based pure rule, and proceeds to check the current value, if available, of all the facts of the list 80, and revise the notes to date 85 and the total score to date 86. Irrespective of the implementation of the update method 87, the publication of the total score to date 86 of a particular questionnaire can provide the sender 4 with a useful piece of information while, for the sake of the user's 7 privacy, the most sensitive private facts, those being the elementary facts making up the questionnaire are kept confidential.

The efficiency of the discovery process is improved by the use of questionnaires as in FIG. 8A. In certain applications, the total score to date 86 for a particular questionnaire may have more meaning for the sender 4 than any single elementary private fact 81. Additionally, the discovery of the value of one elementary private fact 81 can be reused in multiple questionnaires without having to involve the user 7 again. Finally, even if its publication is not authorized, the total score to date 86 can be used by the DEP 14, for instance, by being compared to certain predetermined thresholds in the condition R-c of relevant rules. A further improvement can be made by providing a special version, such as, for example, a Java extension, to the rules described in FIG. 6B through FIG. 6D.

Referring now to FIG. 8B, shown is an example of a pure rule 90 that can be used to determine whether the total score to date 86 can be sent to the sender 4 and written as an outbound public fact 8. In this embodiment, a publishing request is received, as shown in FIG. 6A, comprising a name 61 and value 62 pair. As shown in this figure, the rule 90 has a priority RI-p 240 of 11 and includes the conditions RI-c 242 that the publishing request list is not empty, that the name of the publishing request is not found in the outbound facts table, and that the value 62 associated with the publishing request is an object of a questionnaire class, that is, the value 62 is associated with the name 61 in a questionnaire. The display list 244 RI-d presented to the user 7 discloses the total score to date 86 to the user 7 for securing approval for publication, and also the content of the questionnaire list 80. In this manner, the user 7 understands the manner in which the scoring operation has been carried out by the sender 4 and that the action RI-a 246 only publishes the total score to date 86.

The action 246 RI-associated with this rule 90, is to obtain the current date and create an entry in the outbound public facts table with the name of the publishing request and the current date. The user's 7 response then determines how the permission status will be completed. As described above in FIGS. 6B–6D, a "time out" or a "no" response will cause the permission status to read "denied", while a "yes" response will cause the permission status to read "authorized." Where the permission status indicates that the user 7 has authorized publication of the score, the DEP 14 transfers the score to the memory module 8 containing the outbound public facts and the EPR 16, which then transmits the score via the transaction network 12 to the sender 4. In another embodiment, the user can be questioned as to whether the private facts underlying the score should be transmitted to the memory module 8 containing the outbound public facts. As shown, this embodiment is similar to the embodiment of FIG. 6B. It is to be further appreciated that the rule described in FIG. 6C can further be applied to the questionnaire of FIG. 8A, that is, a prior refusal to publish can be presented again to the user with a request to publish. Similarly, the rule described in FIG. 6D can further be applied to the questionnaire of FIG. 8A, that is, a score that has been authorized for publication can be sent to the sender 4.

Figure 9:
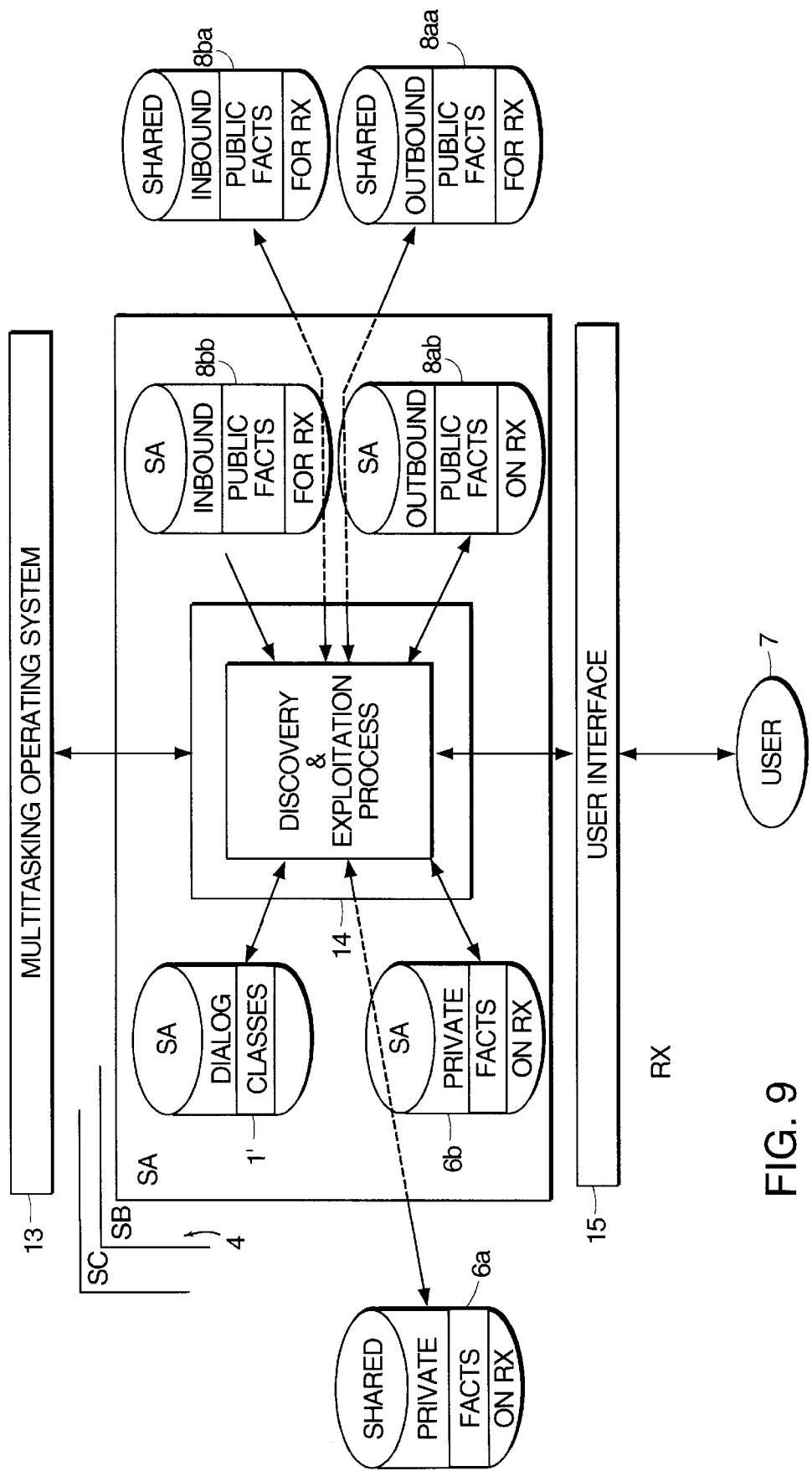
FIG. 9 is a block diagram illustrating another embodiment of the invention in which resources are shared by a plurality of senders.

Referring to FIG. 9, shown is another embodiment of the present invention, in which a plurality of senders 4 are configured to share certain system resources. In the present embodiment, the distribution network 3, the transaction network 10, the interface computer 5, the multitasking operating system 13, the user interface 15, and the DEP 14 can be shared by a plurality of senders 4, given by SA, SB and SC. In another embodiment, only the distribution network 3 and the transaction network 10 can be shared. Where a plurality of senders 4 are on the network, the DEP 14 can be apprised of the senders 4 with which the user 7 wishes to interact, as well as the dialog classes 1 to execute, the private and public facts and the EPRs 16 associated with each sender. As it is the function of the EPR 16 to interact with the DEP 14 by transmitting sender-specific inbound public facts 8bb in an effort to obtain publication of a user's private facts 6a, 6b, the system of the present invention can comprise a plurality of EPRs 16, each of which can be associated with a different sender 4.

In another embodiment, a group of senders SA, SB, SC can agree to share the definition and usage of some or all of the private 6a and public 8aa, 8ba facts. Alternatively, a standard setting committee can publish a collection of base dialog classes (not shown) that the senders 4 agree to implement. Referring again to FIG. 4, steps 18 and 21 can be used in such an embodiment, to ensure sharing of the data objects created from the common data class definitions. In this embodiment, a private fact can be discovered from the user 7 once, but disclosed or published to a plurality of senders after authorization has been given. In another embodiment, certain senders can have only limited access to shared data classes, such as, for example "read-only" classes for less trusted senders.

As shown in FIG. 9, each sender 4 can have sender-specific class definitions, and objects can be created for higher security data items, such as private facts 6b, inbound public facts 8bb, and outbound public facts 8ab. Sender-specific private facts 6b can be private facts disclosed by the user 7 that are applicable to a specific sender 4. For example, where a sender is an automobile dealer, the user's color preferences may be different from the user's color preferences for a sender providing women's apparel. These facts, 6b, 8bb and 8ab can exist for each sender SA, SB, SC, although are shown in this figure for purposes of illustration only, as existing for sender SA 4. It is important to note that these facts, 8bb and 8ab can be used along with the shared private facts 6a, shared inbound public facts 8ba, and shared outbound public facts 8aa. An example of shared private facts stored 6a can be a user's median income. An example of shared inbound public facts 8ba can be the senders' SA, SB, SC 4 goods, time for special offers, etcetera. An example of shared outbound public facts 8a can be well known user facts, such as the user's address, or simply the area of the country that the user if from, i.e. northeast, south, midwest, or west. The publishing request list 60 can further be augmented to include an attribute indicating whether the name/value pair 61, 62 is shared or not shared. In this manner, the requesting rules of FIG. 6B and 6C make the user 7 aware via the display list, that whenever authorization is granted with respect to shared private facts 6a, all senders SA, SB, SC have access to such private facts 6a.

Figure 10A:
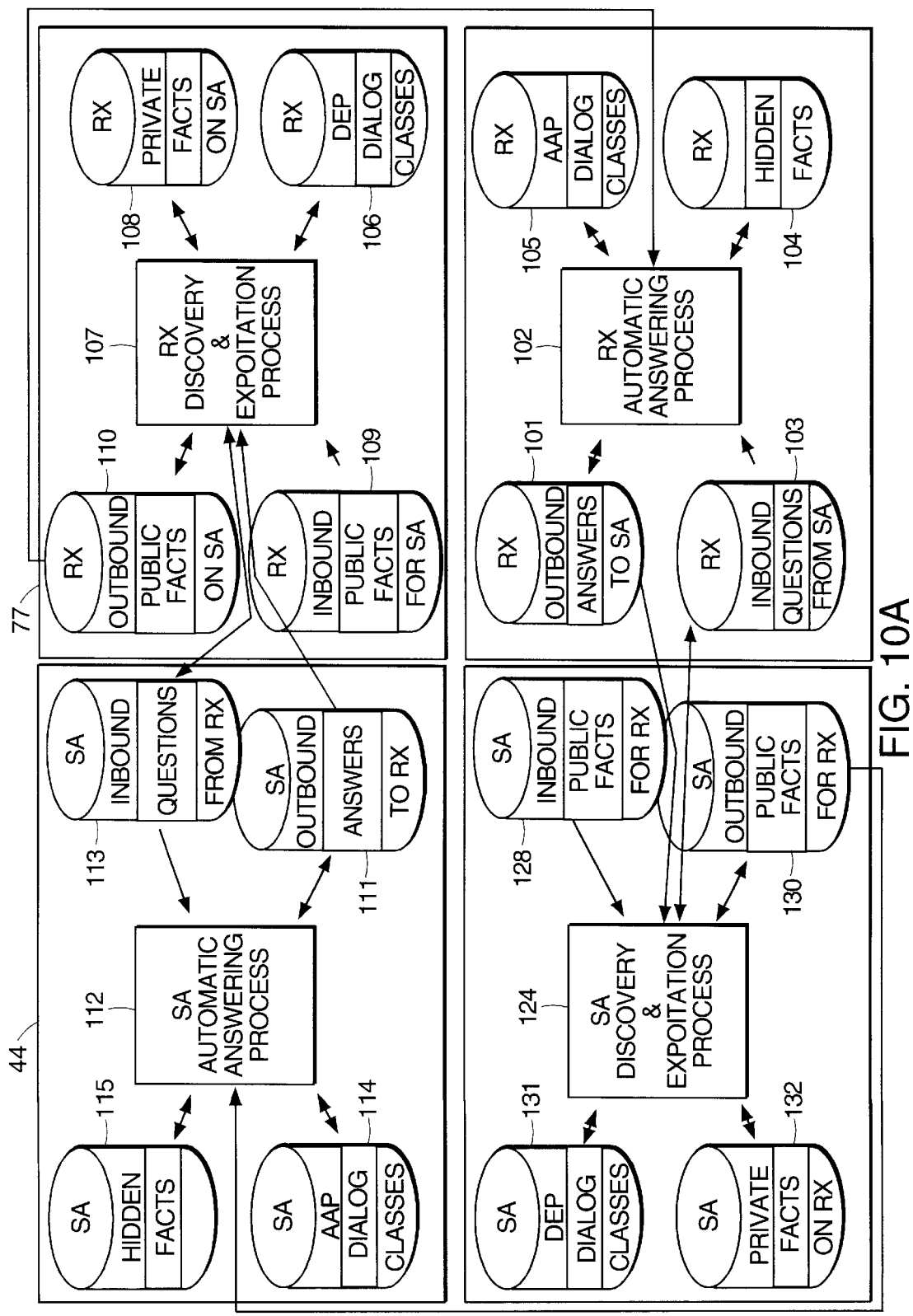
FIG. 10A is a block diagram illustrating an alternative embodiment of the system of the present invention in which the operations carried out by the sender and receiver are automated.

Referring to FIG. 10A, in another embodiment of the present invention, the role of the sender 4 and the user 7, hereinafter referred to as sender 44 and receiver 77, can be automated, both having a pair of rule engines similar to the DEP 14 and the UIP 37. Referring briefly to FIG. 2, in which the UIP 37 interacts with the user 7 via the user interface 15, note that in the present embodiment, such features of the invention are replaced by the receiver "RX automatic answering process" RX-AAP 102 (shown in the lower right quadrant). The RX - AAP 102 interacts with the SA - DEP 124 (shown in the lower left quadrant), which is similar to the DEP 14 of FIG. 2. The RX - AAP 102 and the SA - DEP 124 provide for an automatic exchange of facts about the receiver 77 and the sender 44 to ensue.

Both the RX - AAP 102 and the SA - DEP 124 are implemented as a rule engine, as each instantiates and calls dialog classes in a manner as similarly described in connection with FIG. 2. The RX - AAP 102 calls RX - AAP dialog classes 105, and the SA - DEP 124 calls SA - DEP dialog classes 131. The RX - AAP 102 manages hidden facts 104, which are facts relating to the receiver 77. Hidden facts 104 are typically preprogrammed by the receiver 77 and can include hidden facts to be discovered, as well as ancillary facts such as facts specifying cut-off dates or times at which the hidden facts will no longer be available for discovery as an outbound answer 101 to the SA-DEP 124.

The RX - AAP 102 interacts with the SA - DEP 124 in much the same manner as the UIP 37 interacts with the ML 36 in FIG. 4. The RX - AAP 102 operates on the RX - AAP dialog classes 105, and using inbound questions 103 from the SA - DEP 124, determines which hidden facts 104 to supply as outbound answers 101 to the SA - DEP 124. Thus, the RX-AAP 102 determines which hidden facts are to be discovered to become private facts, and which authorizations are to be given in request for publication of private facts. In this manner, the RX - AAP dialog classes 105 include pure rules 150 configured to permit discovery and ultimately, publication of certain hidden facts 104 in response to certain inbound questions 103 from the senders 44. Additionally, the AAP dialog classes 105 can be configured to interact in a different manner with different senders SA. For example, where a plurality of senders are disposed on a network as discussed in FIG. 9, each sender can have a SA - DEP 124, and the RX - AAP dialog classes 105 can be configured such that discovery and publication are more limited when the interaction is with a certain sender as opposed to other senders. As further described, the RX - AAP 102 can further receive outbound public facts 110 relating to the sender SA and can use such outbound public facts in the interaction with the SA - DEP 124 to determine which hidden facts 104 should be discovered and which hidden facts 104 should be published.

The SA - DEP 124 executes the SA - DEP dialog classes 131 in a manner similar to the DEP 14, and receives inbound public facts 128 comprising information about the sender 44 described above. As similarly described above, the SA - DEP 124 manages private facts 132 and an outbound public fact list 130 comprising a hash table 63. As stated above, private facts 132 are, in the present embodiment, private facts obtained from the hidden facts 104 sent by the RX-AAP 102 as outbound answers 101 to the SA - DEP 124. The outbound answers 101 are determined in response to the interactive rules in the SA - DEP 124, to be facts available for discovery in accordance to the rules associated with the RX-AAP dialog classes 105. The rules associated with the RX-AAP 105 dialog classes, like those described in connection with the sender 4 above, control the strategy of the receiver 77 in the interaction between the SA-DEP 124 and the RX-AAP 105. Thus, for disclosure and publication of certain hidden facts to result, the dialog classes 105 must be configured to permit such to occur.

Referring again to the SA-DEP 124, outbound public facts 130, those being private facts obtained from the RX-AAP 102 as outbound answers 101 resulting from a publishing request by the SA - DEP 124, are listed in the hash table 63 with a permission status set as a yes or no outbound answer 101 to the SA - DEP 124. Such an outbound answer 101 is determined, in response to the interactive rules of FIG. 6B and 6C of the SA - DEP 124, to be facts available for disclosure in accordance to the rules associated with the AAP dialog classes 105. It is important to note that the outbound public facts 130 are made available to the SA - AAP 112, shown in the upper left quadrant, to aid the SA - AP 112 in determining which of its SA - hidden facts 115 should be discovered and published.

The SA - AAP 112, shown in the upper left quadrant, operates in a similar manner as the RX - AAP 102 described above. Like the RX - AAP 102, the SX - AAP 112 operates on SA - AAP dialog classes 114 and answers inbound questions 113 from the receiver 77. The answers are provided to the RX - DEP 107 in the form of outbound answers 111, and are determined using the sender's hidden facts 115 and the outbound public facts 130 that relate to the receiver 77, sent to the SA - AAP 112 from the SA - DEP 124.

The RX - DEP 107, shown in the upper right quadrant, operates in a similar manner as the SA-DEP 124. The RX-DEP 107 uses the RX - DEP dialog classes 106 and the outbound answers 111 to determine which inbound questions 113 should be presented to the SA - AAP 112 to obtain further hidden facts 115 about the sender 44 that are of interest to the receiver 77. In this regard, the RX - DEP 107 receives inbound public facts 109 relating to the receiver 77, manages private facts 108 and outbound public facts 110 about the sender 44. Whether certain SA hidden facts 115 are to be discovered to the RX - DEP 107 as outbound answers 111 to be stored as private facts 108, and which facts are potentially published as outbound public facts 110 is determined by the SA-AAP 112 in response to the interactive rules executed by the RX - DEP 107. The outbound public facts 110 are disclosed by the RX - DEP 107 to the RX - AAP 102 to aid the RX - AAP 102 in responding to the SA - DEP 124.

The symmetry, as described in the FIG. 10A, is especially advantageous when implemented with a plurality of senders 4 and receivers 7. In an embodiment where the distribution network 3 is two-way, a central database can be used to store the electronic addresses of all participating or registered sending and receiving parties. The purpose of the database is to trigger the initialization of the process described in FIG. 10B, that is, an encounter, for any two registered parties and record the occurrence of such encounters. Another implementation is to rely on the initiative of the parties to contact one another independently of any third user organization.

In another embodiment, a central computer can be used for all data definition sharing, data objects storing and retrieval, dialog class and external process management. This embodiment of the invention, can be implemented for example with an object database coupled to the interface computer 5, having stored therein, RX and SA hidden facts, dialog classes and public facts. The interface computer 5 can act as a central marketplace where senders/receivers gather to exchange information, and the database administrator can act as the market organizer. Relying on the database administrator to keep all data in confidence, especially from other registered parties, the receiver RX - AAP dialog classes 105 can reference the private facts 108 on the sender 44 along with the outbound public facts 110 on the sender 44, and the sender SA - AAP dialog classes 114 can reference the private facts 132 on the receiver 77 along with the outbound public facts 130 on the receiver 77.

While the functional symmetry does not make any formal distinction between senders and receivers, it is expected that the business objectives of senders and receivers fall into a plurality of distinct categories. For example, one category may be seeking employment or goods or services of a specific kind while another may offer such employment or such goods and services. The purpose of the discovery and exploitation process is then for a user in one category to find a suitable partner in the opposite category and the purpose of the answering process is to limit data exchange with a potential partner to what is necessary to reach a conclusion on the suitability of the partner. Encounters can be provided for example by systematically matching any newly registered user in succession with all parties already registered in the opposite category. The result for the user can be a qualified list of opposite parties appropriate for further consideration. The exact nature and significance of such consideration can depend on the user organizing the market and on the parties' business objectives. To illustrate a case with two distinct categories, one can take the employment market with job seekers and employers as described below in conjunction with FIG. 12. For three distinct categories, a reference provider can be added to respond to employers looking for recommendations on job seekers and job seekers seeking information about prospective employers.

Referring to FIGS. 10B and 10C in conjunction with FIG. 10A, the SA - DEP 124 and the RX - AAP 102, as well as the RX - DEP 107 and the SA - AAP 112 interact using rules having a similar format as the special request as described in FIG. 7A, 7B and 7C. For purposes of illustration, the interaction between the SA - DEP 124 and the RX AAP 102 is described herein. As shown, associated with inbound question 103 is signal QUE 126, similar to inbound signal 71, which is set by the SA-DEP 124 and transmitted from the SA - DEP 124 to the RX - AAP 102. As shown, the inbound question 103 comprises a list of ordered sequence of name 116 and value 117 pairs. Based on inbound question 103 and the QUE signal, the RX - AAP 102 sets a special request, the DEP interaction 125 and proceeds to provide an outbound answer as a list 101 of ordered name 118 and value 119 pairs using the RX - AAP dialog classes 105. When all questions provided in the inbound question 103 list have been processed or some time-out has elapsed, the RX - AAP 102 resets the DEP interaction 125 and sets signal ANS 127, similar to outbound acknowledgment 72. Upon receipt of signal ANS 127, the SA - DEP 124 resets signal QUE and proceeds to analyze the outbound answer list 101. After inbound question signal QUE 126 has been reset by the SA-DEP 124, the RX - AAP 102 resets the acknowledgment signal ANS 127 such that a new question/answer cycle can occur.

It is important to note that the overall logic flow described in FIG. 4 is adjusted to match the architecture of FIG. 10A. Referring to FIG. 10B and 10C in conjunction with FIG. 4, the information 38 produced in step 25 by the display list RI-d of an interaction RI 152 is formatted as the list of inbound question 103, using name 116 and value 117 pairs where the value 117 is left blank. The inbound question list 103 is transmitted together with the signal QUE 126 having a value indicating that it is "set". As further described, the condition R-c of the interaction RI-a can further include a check that the acknowledgment ANS 127 is "reset". The display list RI-d further compiles a decision record 120 comprising a name 121, which corresponds to the name 116 of one of the inbound questions 103, and a decision list 122 comprising value 123 and code 124 decision pairs. The decision list 122 must correspond to the list of possible outcomes expected by the action RI-a of the interaction RI 152 and the codes to the indices for the user decision. Taking as an example an interaction rule expecting either "yes" or "no" or "time out" as indexed by 2, 1 and 0 respectively as its action RI-a, the decision record 120 can be {"decision", {("yes",2), ("no",1), ("time-out",0)} Similarly the user decision and data expected in FIG. 4, step 27 is formatted as a list of outbound answers 101, each comprising a name 118 and value 119 pair, together with the acknowledgment signal "ANS" 127 having a value indicating that it is "set".

The information asked for by the SA - DEP 124 in the form of the question list 103 is received by the RX - AAP 102 and responded to by the RX - AAP 102 as the list of outbound answers 101 such that, for each question in the question list 103, one outbound answer exists whose name 118 matches the name 116 of the question. This includes an answer whose name 118 matches the name 121 of the decision record 120, and whose value 119 matches the value 123 of a value code pair 122 in the decision list 120. The SA - DEP 124 takes the code 129 of this code pair for the decision expected by the interaction RI. Following the above example, if the list 101 includes the pair ("decision","yes"), the decision index '2' is passed to step 28.

Referring again to FIG. 4 to further illustrate the operation of the rules of the present embodiment, it is important to note that if step 27 cannot find a valid decision or answers that match what is expected as the action of an interaction rule, the SA-DEP 124 sets the decision to its "time out" value.

Referring again to FIG. 4, whether step 28 is reached through the time out 26 or through a decision based on the RX dialog classes 105 and the RX hidden facts 104, step 28 resets the signal QUE 126.

Figure 10F:
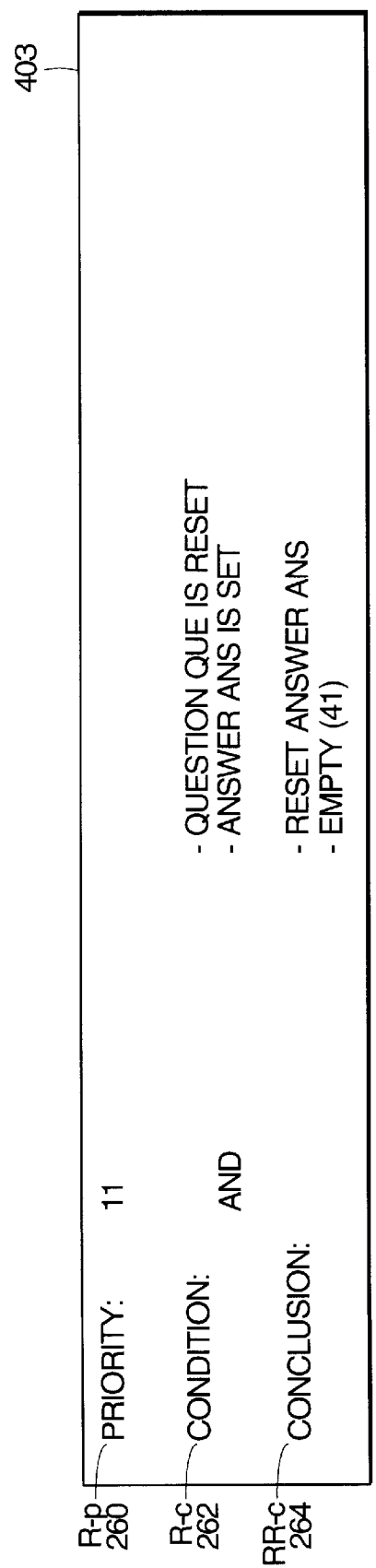

Referring to FIGS. 10D, 10E and 10F, shown are three pure rules that govern the RX - AAP 102 as it interacts the SA - DEP 124, and the SA-AAP 112 as it interacts with the RX-DEP 107. These rules are similar to rules 74 and 76 described in reference with FIGS. 7B and 7C, and for purposes of illustration only, will be described in connection with the interaction between the SA-DEP 124 and the RX-AAP 102. Each rule 401, 402, 403, preferably has a priority 248, 254, and 260 of 11, such that the rules are accorded priority in processing. It is to be appreciated that rules 74 and 76 are processed by the DEP 14, to allow interruption by the ERP 16, while rules 401, 402, 403 are processed by the RX-AAP 102, to allow interruption by the SA-DEP 124.

The rule 401 as shown in FIG. 10D, initializes the RX-AAP 102 to provide an outbound answer 101 as triggered by the signal QUE 126 from the RX-AAP 102. The conditions R-c 250 associated with rule 401 are that the QUE 126 is set, the DEP interaction 125 is reset and the answer ANS 127 is reset, that is, the RX - AAP 102 is ready to process an inbound question list 103. The conclusion 252 RR-c is that the DEP interaction 125 is set, the inbound question list associated with signal QUE 126 is copied into the display information 39, and the chronometer is initialized for a time-out, should the RX - AAP 102 not have an appropriate response to the question. For each question copied into the display information 39, there exists a pure rule in the dialog classes 105 of the RX AAP 102 which, under appropriate conditions, will conclude by entering a matching answer and by deleting the question from the display information 39. What is meant by a matching answer is further illustrated below in FIG. 12.

The rule 402 shown in FIG. 10E describes the acknowledgment given to the SA DEP 124 when the RX - AAP 102 has completed responding or has failed to respond. As shown, the conditions 256 R-c associated with this rule are such that the display information 39 has been emptied or cleared by the execution of appropriate pure rules included in the dialog classes 105, or a time-out has elapsed. The conclusion 258 RR-c associated with this rule is that the DEP interaction parameter 125 is reset and the outbound answer ANS 127 is set. Additionally, the display list 39 is again cleared. It is to be appreciated that replacing rule 74 by rules 401 and 402 the acknowledgment signal ANS 127 acknowledges having both received and taken the signal QUE 126 into consideration, i.e. processed or ignored the question 103, while corresponding signal ACK 72 is sent immediately upon receipt, before any substantive consideration.

The rule 403 shown in FIG. 10F describes the resetting of parameters by the RX - AAP 102 after an outbound answer 101 has been sent and received by the SA - DEP 124. As shown, the condition 262 R-C associated with this rule includes that the signal QUE 126 is reset and the acknowledgment signal ANS 127 is set. The conclusion RR-c 264 associated with this rule resets the signal ANS, such that the RX - AAP 102 is ready to provide another answer when prompted again with signal QUE 126.

Figure 11A:
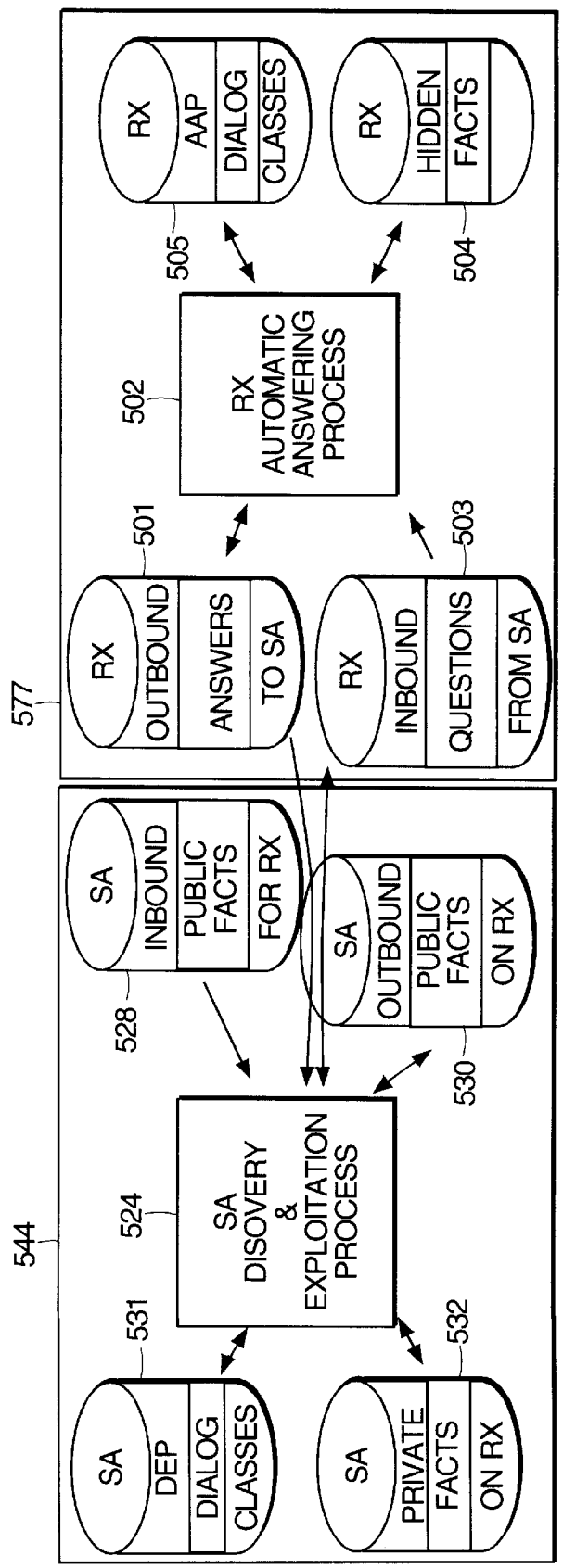
FIG. 11A is a block diagram illustrating another embodiment of the system of the present invention in which the sender and receiver are automated.

In another embodiment as shown in FIG. 11A, the sender 544 need only have an SA - DEP 524, and the user or receiver 577 need only have an RX - AAP 502. In this embodiment, the system of the present invention is similar to the portion of the system embodied in the lower left and right quadrants of FIG. 10A. This embodiment can be further considered an automated version of the embodiment of FIG. 2. As described above, the sender 544 provides inbound public facts 528 and uses the SA - DEP 524 to generate inbound questions 503 to the RX -AAP 502, to which outbound answers 501 are provided by the RX - AAP 502 using the RX - AAP dialog rules 505 and the hidden facts 504. The outbound answers are processed by the SA - DEP 524 to determine private facts 532 and outbound public facts 530 relative to the receiver 577. The present embodiment can be useful in a situation, such as, for example where the sender is a corporate headquarters and the receivers are employees reporting to the headquarters. In this way, employees are responsible for providing the hidden facts and the headquarters staff determine the facts to be discovered locally and the facts to be disclosed back to headquarters.

Figure 11B:
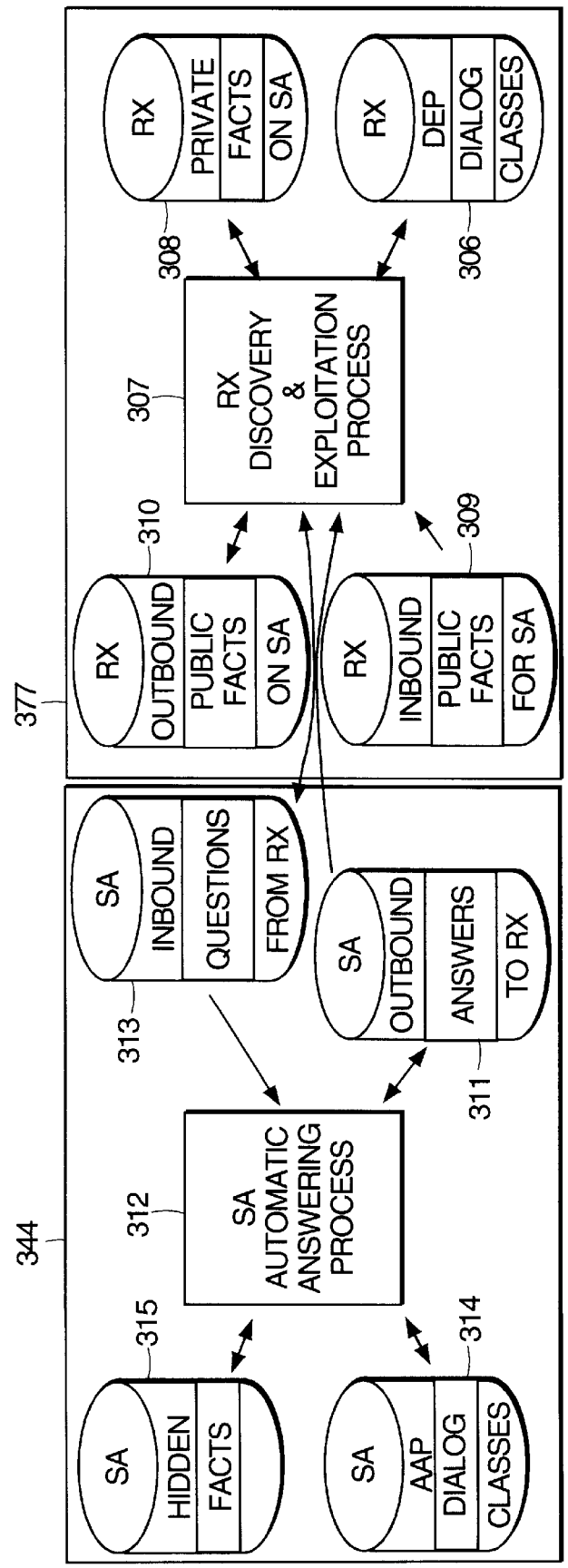
FIG. 11B is a block diagram illustrating yet another embodiment of the system of the present invention in which the sender and receiver are automated.

Similarly, in another embodiment as shown in FIG. 11B, a sender 344 can simply dispense information to a user or receiver 377. This embodiment corresponds to the upper left and right quadrants of the system of FIG. 10A. In this manner, a receiver 377 having an RX - DEP 307, can obtain certain hidden facts 315 in the form of outbound answers 311 from the SA - AAP 312. This embodiment can be used where the sender 344 is a government agency providing hidden facts 315 in the form of outbound answers 311 to certain users 377 having varying levels of authorization. For example, where a user 377 is a government official, the dialog classes 314 of the sender 344 would elicit different outbound answers 311 than they would for a civilian. In both the embodiment of FIG. 11A and 11B, the interaction of the SA - DEP 524 and the RX 11 502, as well as the interaction between the RX - DEP 307 and the SA - AAP 312, can be similar to the interaction described between the DEP and the AAP, above in FIGS. 10A, 10B, 10C, 10D, 10E and 10F.

Figure 12B:
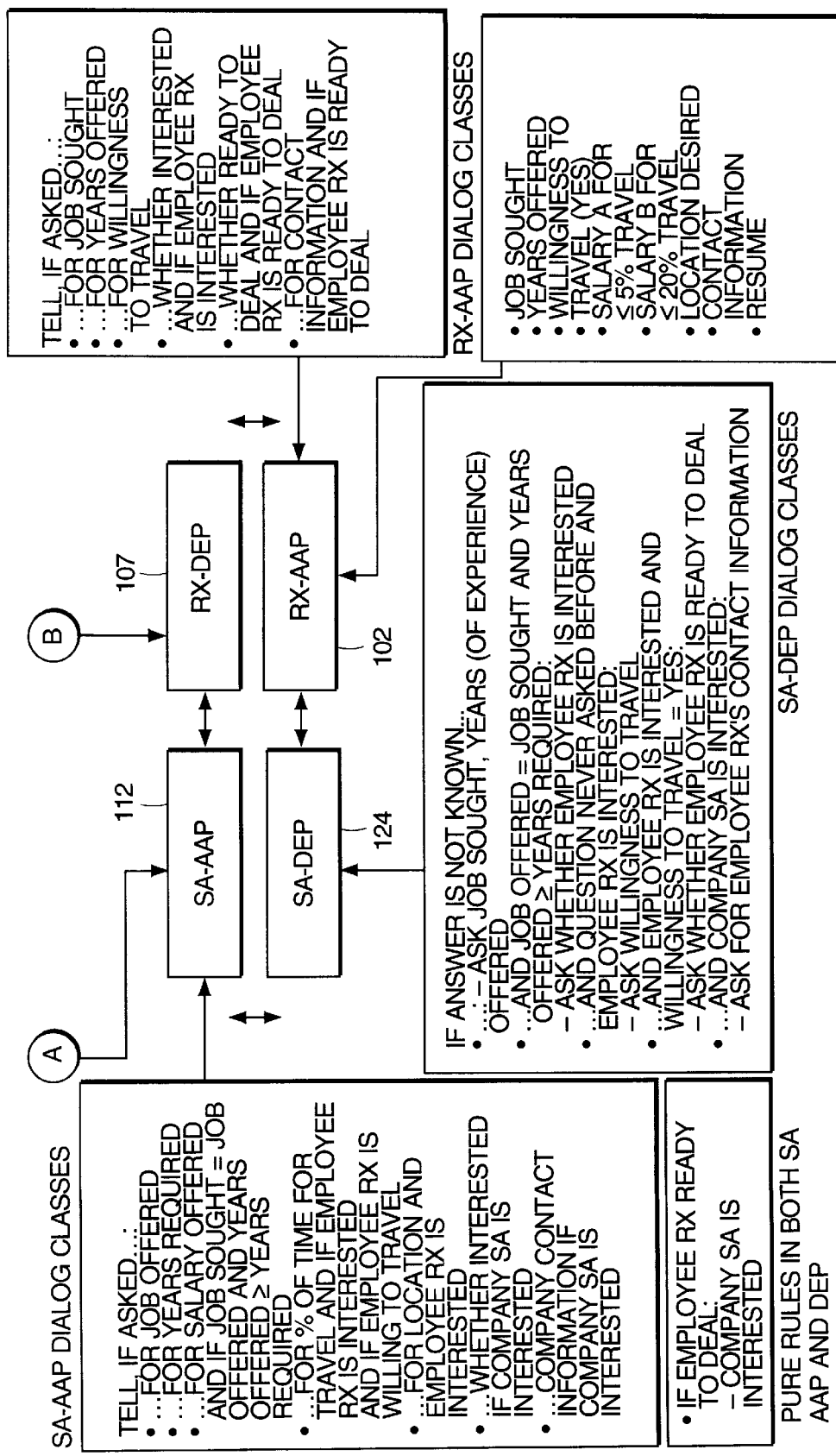
FIG. 12 is a block diagram illustrating an example of a sender and receiver carrying out automated processing using the system of the present invention.

Referring now to FIG. 12, shown is an example of the automatic answering process of the present invention, in which the sender is a prospective employer having a sending agent, hereinafter "employer's agent" and the employee is a prospective employee having a receiving agent, hereinafter "employee's agent". As similarly shown in FIG. 10A, the SA-AAP and the SA-DEP are the employer's agent, and the RX-AAP and the RX-DEP are the employee's agent. As described above, each of the DEP and AAP units rely on dialog classes to determine which questions to ask of an opposing unit, and which answers to provide. Referring to the SA-DEP dialog classes, the employer's agent will ask job sought and years of experience offered, if these facts are not known. These questions can be provided as inbound questions to the RX - AAP, whose dialog classes are configured such that the RX - AAP can provide without condition, as outbound answers, the job sought, the years of experience offered and the willingness to travel.

The SA-DEP dialog classes, can then ask other questions and inbound questions, depending on what the RX-AAP has provided as outbound answers. It is important to note that if a match is not found in both categories, job and years, future communication between the employer's agent and employee's agent can be terminated by the employer's agent and/or the employee's agent, on the basis that the other party is not of interest to the party. As shown, the SA-DEP dialog classes can ask the RX-AAP if the employee is interested, when it is found that the conditions of job sought and job offered match, and when the condition of years of experience is greater than the number of years required. The RX-AAP dialog classes are configured to express interest if indeed the employee is interested.

Associated with the RX-AAP dialog classes are hidden facts such as the job sought, the years offered, a general willingness to travel, the salary desired if travel is about 5% of the job, the salary desired if travel is about 20% of the job, geographic location desired, contact information, and resume. It is to be appreciated that such hidden facts can be given as outbound answers to the SA-DEP, as discovery of such facts. As for publication of such facts, further RX-AAP rules can decide whether publication of these facts as outbound public facts to the SA-AAP, will be granted based upon the requests made by the SA-DEP according to further SA-DEP rules.

As shown, the SA-DEP dialog classes can ask willingness to travel if the RX-AAP returns as an outbound answer that the employee is interested, and the willingness to travel has not yet been provided as an outbound answer. Additionally, if the employee's agent has indicated interest and a willingness to travel, the SA-DEP can ask if the employee is ready to deal, that is, whether the employee is ready to schedule a face to face meeting, disclose identity, contact information and/or a resume. The RX-AAP dialog classes are configured to provide a willingness to deal when asked by the SA-DEP and there exists a willingness to deal. Finally, if the employer's agent has determined interest, the SA-DEP can ask the employee for the relevant contact information if not yet known. The RX-AAP will provide it, assuming the employee is ready to deal.

Pure rules associated with the SA-DEP dialog classes can determine which questions are to be provided to the RX-AAP and in what sequence they are to be provided. For instance a pure rule can determine whether the employee is of interest to the employer's agent, or whether communication should be terminated. Similarly, pure rules associated with the RX-AAP dialog classes can determine additional hidden facts, and which answers are to be provided to the SA-DEP. For instance a pure rule can determine whether the employee is interested in the employer's proposal, or whether communication should be terminated. As shown, after the SA-AAP gives out information on the job and the salary offered, a pure rule can determine if the employee is interested when jobs offered and sought match, and when the salary offered is greater than the minimum salary sought for travel about 5% of the job. Furthermore, in receipt of the amount of travel involved, another pure rule can determine if the employee is ready to deal if the salary offered is greater than the minimum salary sought, after having considered the amount of traveling required.

While the above-described interaction is occurring, that is, while the employer's agent is obtaining hidden facts from the RX-AAP and making a determination as to whether the employer is interested in the prospective employee, the RX-DEP executes dialog classes associated therewith to determine if the prospective employee is interested in the employer or even ready to deal. For instance, the employee's agent can ask without condition as inbound questions, the job offered, years experience required and salary offered. Additional rules can ask the percentage of travel that is required and the geographic location of the position, when the job offered matches the job desired and the salary offered is greater than the salary desired. Similarly, if the employee's agent has determined a willingness to deal, the RX-DEP can ask whether the employer is interested and for employer or company information. As similarly described above, pure rules associated with the RX-DEP dialog classes can determine whether the employee is interested in or even ready to deal with, the prospective employer.

In response to inbound questions from the RX-DEP, the SA-AAP dialog classes can determine the appropriate response, that is, which hidden facts, can be provided as outbound answers. The hidden facts associated with the SA-AAP dialog classes are the job offered, year experience, salary, percentage travel, location offered, company information and contact information. As shown in this figure, the SA-AAP can provide, without condition, the job offered by the employer and number of years of experience required. Salary information can be given only if the job offered and the years of experience offered is greater than the years required, according to the dialog classes. Similarly, the percentage of travel can be given when the employee's agent indicates an interest and a willingness to travel of the prospective employee. Similarly, the location can be given when the employee's agent indicates interest of the prospective employee. Finally the fact that the employer is interested can be given if it is indeed the case according to the same rule used by the SA-DEP.

As described above, depending upon the configuration of the dialog classes and the outbound answers, the prospective employer and prospective employee can determine their respective interest without having to provide their identity to each other. If interest exists, contact information can be published to the party requesting it, however, if no interest exists, communication can be terminated, and the confidentiality and anonymity of both the prospective employee and the prospective employer is preserved. It is to be appreciated that the example provided in FIG. 12 is simply one implementation of the present invention, and that other, more complex communication strategies and tactics can be designed. Additionally, other businesses, persons or entities can be provided to replace the prospective employer's agent and the prospective employee's agent, to discover facts about each other, determine interest, and publish only those facts for which authorization has been given.

While the invention has been particularly shown and described with reference to the preferred embodiments, it should be understood by those skilled in the art that various changes in form and detail may be made therein without departing from the spirit and scope of the invention as defined by the appended claims.

What is claimed is:

1. System controlling the disclosure of facts of potential interest between parties, comprising:
    a sender in communication with a first transmission medium;
    a user in communication with a second transmission medium;
    an agent in communication with said sender via said first transmission medium and in communication with said user via said second transmission medium, said agent comprising:
        a processing module for initiating queries of said user, each of said queries asking said user to reveal a user related fact or to provide authorization for publication of said user related fact to said sender; and
        a memory module in communication with said processing module for storing said user related facts and said authorizations for publication of said user related facts;
    wherein said agent communicates to said sender only facts having authorization for publication provided by said user.

2. The system according to claim 1, wherein said processing module executes rules each of said rules having a condition and an action to be performed when said condition is satisfied.

3. The system according to claim 2, said rules further comprising interactive rules presenting said queries to said user.

4. The system according to claim 3, said interactive rules further presenting suggestions to said user.

5. The system according to claim 2, said rules further comprising pure rules exploiting said user related facts revealed by said user.

6. The system according to claim 2, said rules having a priority accorded thereto.

7. The system according to claim 6, wherein said processing module selects for execution a rule based on said priority accorded thereto.

8. The system according to claim 7, wherein said priority is variable in response to said user related fact revealed by said user.

9. The system according to claim 1, said sender transmitting via said first transmission medium, a request for publication of user related facts revealed by said user.

10. The system according to claim 9, said processing module, in response to said request, providing said request for publication to said user, receiving a response from said user, said response comprising one of the following: authorization for publication, denial of publication.

11. The system according to claim 10, said processing module further providing a time-out period within which said user response must be received, after which time, said processing module considers said response a denial of publication.

12. Method for providing secure discovery and publication to a first entity of facts relative to a second entity comprising:
    receiving at a processing unit, a request from said first entity for a fact relative to said second entity;
    providing said request to said second entity;
    discovering from said second entity information comprising said fact relative to said second entity;
    storing and exploiting said fact relative to said second entity and said information, said information comprising an authorization for publication of said fact relative to said second entity to said first entity; and
    publishing said fact relative to said second entity to said first entity only when said information includes a grant of authorization to publish said fact relative to said second entity to said first entity.

13. The method according to claim 12, further comprising:
    storing and exploiting said fact relative to said second entity when said information includes a denial of authorization to publish said fact relative to said second entity to said first entity.

14. The method according to claim 12, further comprising generating a list of name and value pairs, each name specifying a label associated with a fact, and each value specifying an answer revealed by the user for said fact.

15. The method according to claim 14, further comprising:
    compiling an outbound facts list comprising facts which have a grant of authorization; and
    transmitting said facts in said outbound facts list to said first entity.

16. The method according to claim 15, further comprising:
    creating a private facts list comprising facts having a denial of authorization; and
    requesting of the user, a grant of authorization of said facts in said private list.

17. The method according to claim 16, further comprising:

transferring a specific fact from said private fact list to said outbound facts list when said user responds with a grant of authorization of said specific fact.

18. System providing controlled disclosure of facts to a first entity by a second entity, comprising:

said first entity in communication with a transmission medium, said first entity comprising a first processing module transmitting a request for publication of a first fact over said transmission medium, wherein said first fact is related to said second entity; and said second entity in communication with said transmission medium, receiving said request for said first fact from said first entity, said second entity comprising:

a memory module storing a plurality of facts including said first fact, each of said plurality of facts having an indicia of authorization for publication of each of said plurality of facts; and a second processing module in communication with said memory module, for determining whether said indicia of authorization for said first fact permits publication of said first fact to said first entity, and disclosing said first fact to said first entity when said indicia of authorization permits publication of said first fact.

19. The system according to claim 18, said second processing module:

compiling an outbound list of facts whose indicia of authorization permit publication; and transmitting said facts in said outbound list to said first entity.

20. The system according to claim 18, further comprising:

creating a private list of facts in said memory module whose indicia for authorization do not permit publication.

21. The system according to claim 18, wherein said first processing module, upon receiving said first fact, processes said fact to determine whether a request for a second fact should be generated.

22. The system according to claim 18, further comprising:

a third entity in communication with said transmission medium, said third entity revealing each of said plurality of facts to said second entity.

23. The system according to claim 22, further comprising:

creating a private list of facts in said memory module whose indicia for authorization do not permit publication; and requesting of said third entity permission for publication of said facts in said private list.

24. The system according to claim 22, said second processing module exploiting said facts with a plurality of rules, said rules including prompts to said third entity requesting said facts.

25. The system according to claim 24, wherein said third entity comprises a third processing module.

26. The system according to claim 22, said second processing module exploiting said facts provided by said third entity and providing suggestions to said third entity.

27. The system according to claim 26, said second processing module providing suggestions that suggest to said third entity that said third entity communicate over said transmission medium with said first entity.

28. The system according to claim 26, said second processing module providing queries to said third entity for said facts and said indicia of authorization for publication.

29. Method providing controlled publication of facts to a first entity by a second entity, comprising:

transmitting from said first entity, a request for publication of a first fact over a transmission medium, wherein said first fact is related to said second entity;

receiving at said second entity, in communication with said transmission medium, said request for said first fact from said first entity;

accessing storage for said first fact and information relating to said fact, said information comprising an authorization for publication of said first fact to said first entity;

determining whether said information includes a grant of authorization for publication of said first fact to said first entity; and publishing said first fact to said first entity when said grant of authorization permits publication of said first fact.

30. The method of claim 29, said first fact and said information further comprising:

questionnaire and a score; and publishing said score to said first entity when a determination of a grant of authorization is made.

31. The method of claim 29, further comprising:

prompting a third entity for a first fact in response to a request for said first fact;

discovering said first fact from said third entity; and generating additional prompts of said third entity in response to said first fact.

32. The method of claim 31, wherein said step of generating additional prompts comprises:

executing a plurality of rules, said rules exploiting said first fact to determine whether additional prompts of said third entity should be made.

33. The method of claim 29, further comprising:

receiving at said second entity a plurality of requests for publication;

prompting a third entity in response to said plurality of requests for publication;

discovering by said second entity a plurality of facts in response to said prompting;

assigning certain of said plurality of facts for publication to said first entity, said certain plurality of facts including a grant of authorization; and publishing said certain of said plurality of facts to said first entity.

34. System for automatically determining mutual interest of entities comprising:

a first agent interacting with a first entity, and representing a second entity in said interaction with said first entity, said first agent being in communication with said second entity via a network;

a second agent interacting with said second entity and representing said first entity in said interaction with said second entity said second agent being in communication with said first entity via said network, said first agent comprising a processing module for executing a plurality of rules, said rules comprising interactive rules initiating queries of said first entity, said queries asking said first entity to provide a fact and authorization for publication of said fact to said second entity, and said rules exploiting said facts; and a memory module for storing said facts and said authorization for publication of said facts to said second entity; and said second agent comprising a processing module for executing a plurality of rules, said rules comprising interactive rules initiating queries of said second entity, said queries asking said second entity to provide a fact and authorization for publication of said fact to said first entity, and said rules exploiting said facts; and a memory module for storing said facts and said authorization for publication of said facts to said first entity;

wherein said first agent communicates to said second entity only facts having authorization for publication provided by said first entity, and wherein said second agent communicates to said first entity only facts having authorization for publication provided by said second entity.

35. Method for providing progressive, confidential determination of mutual interest between a pair of entities among a plurality of entities connected to a transmission network comprising:

(a) transmitting from a first entity, queries via said network;

(b) receiving said queries via said network at a second entity;

(c) presenting said queries by said second entity to a third entity on behalf of said first entity;

(d) revealing facts and authorizations to publish said facts to said first entity by said third entity to said second entity;

(e) discovering facts and authorizations to publish said facts to said first entity by said second entity from said third entity;

(f) exploiting said facts by said second entity;

(g) publishing said facts about said third entity by said second entity to said first entity via said network when authorization to publish said facts has been given by said third entity to said second entity; and (h) receiving said facts about said third entity from said second entity by said first entity via said network.

36. The method of claim 35, further comprising:

(i) transmitting from said third entity, queries via said network;

(j) receiving said queries via said network at a fourth entity;

(k) presenting said queries by said fourth entity to said first entity on behalf of said third entity;

(l) revealing facts and authorizations to publish said facts to said third entity by said first entity to said fourth entity;

(m) discovering facts and authorizations to publish said facts to said third entity by said fourth entity from said first entity;

(n) exploiting said facts by said fourth entity;

(o) publishing said facts about said first entity by said fourth entity to said third entity via said network when authorization to publish said fact has been given by said first entity to said fourth entity;

(p) receiving said facts about said first entity from said fourth entity by said third entity via said network;

(q) transmitting new queries and suggestions by said first entity via said network to said second entity, taking into account published facts about said third entity received so far by said first entity; and (r) repeating steps (a) through (q) until said first entity and said third entity stop communicating with said second entity and said fourth entity.

37. The method of claim 35, said facts comprising a questionnaire and a score, said score being published when one of said entities grants authorization.

38. The method of claim 36, said facts comprising a questionnaire and a score, said score being published when one of said entities grants authorization.

* * * * *